Figure 1:
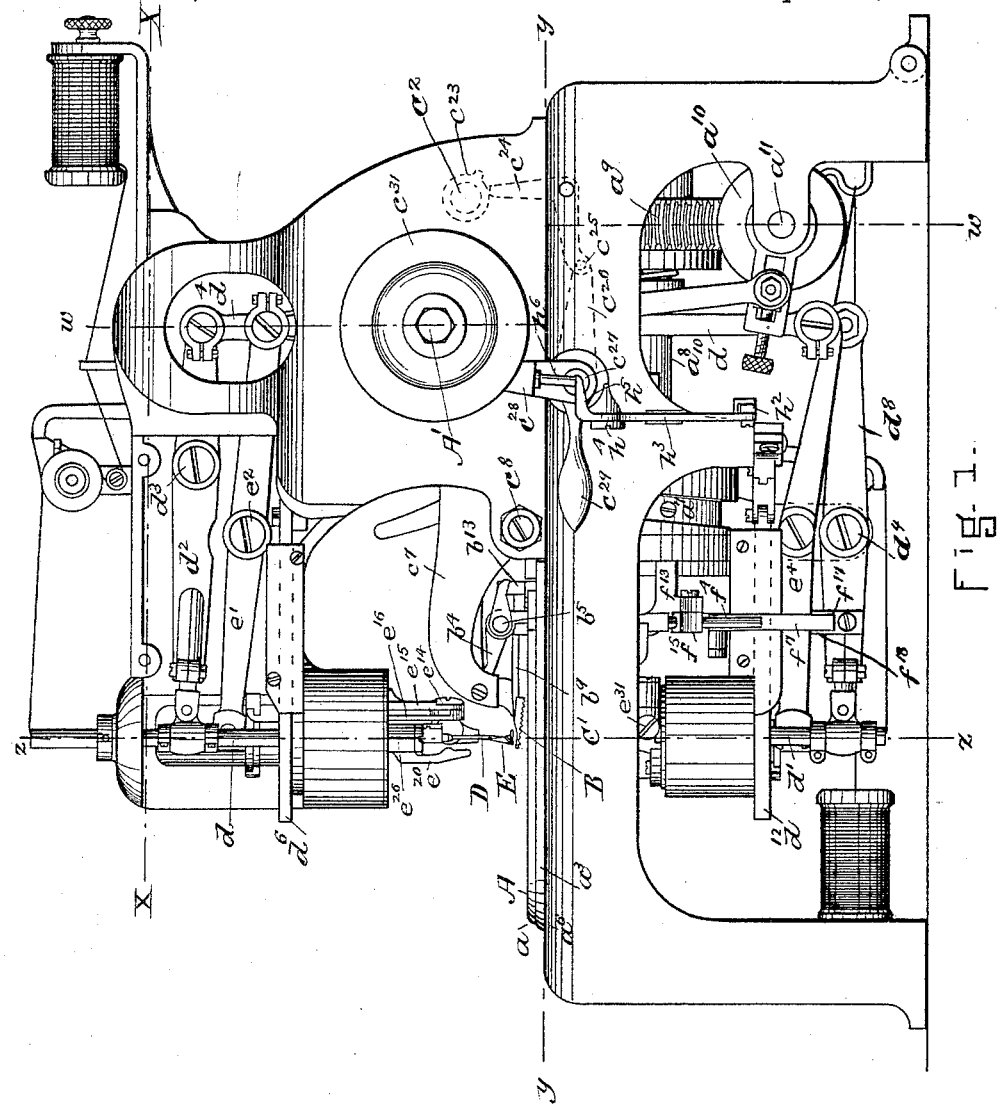

(No Model.) 17 Sheets—Sheet 1.

J. H. REED & C. A. DAHL.
BUTTON HOLE STITCHING AND BARRING MACHINE.

No. 450,950. Patented Apr. 21, 1891.

WITNESSES.
A. P. Porter
J. T. Ball

INVENTORS.
James H. Reed
Charles A. Dahl
by their atty
Clarke & Raymond

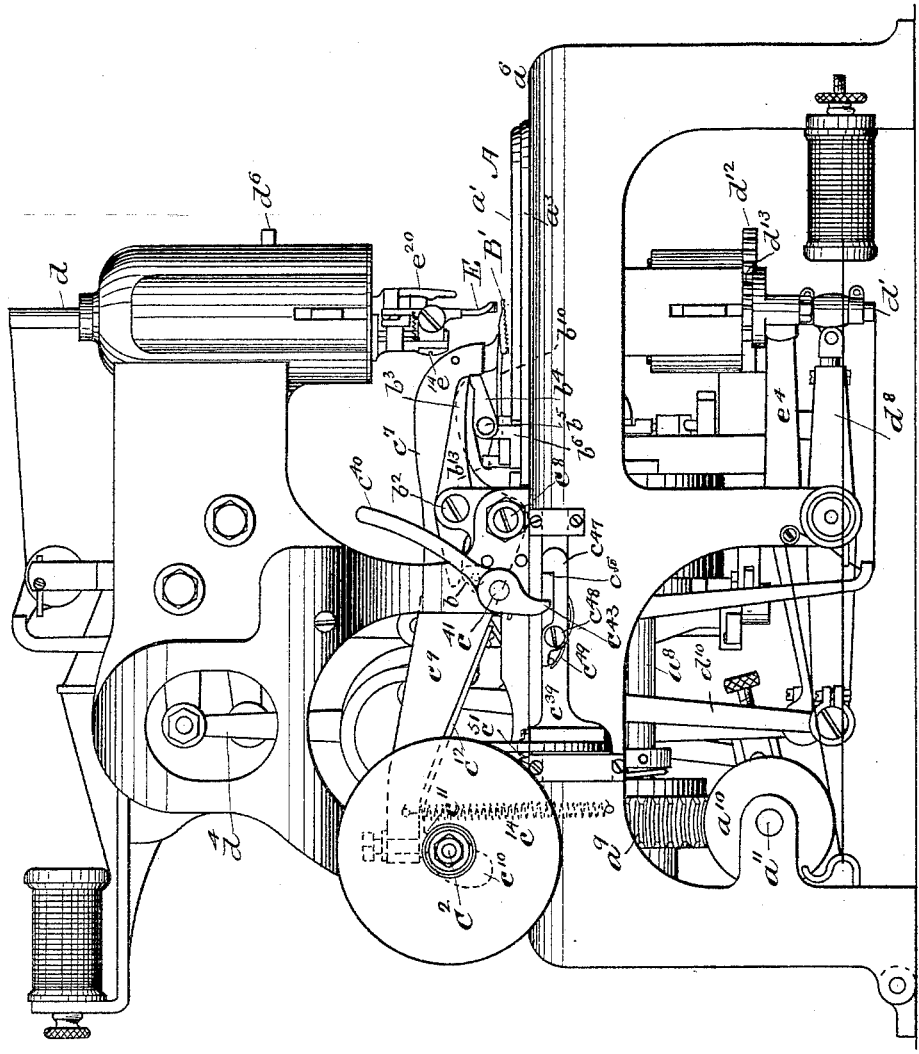

(No Model.) 17 Sheets—Sheet 3.
J. H. REED & C. A. DAHL.
BUTTON HOLE STITCHING AND BARRING MACHINE.
No. 450,950. Patented Apr. 21, 1891.

WITNESSES.
A. P. Potter,
J. T. Ball

INVENTORS.
James H. Reed
Charles A. Dahl
by their Attys
Clarke & Raymond (No Model.) 17 Sheets—Sheet 4.
J. H. REED & C. A. DAHL.
BUTTON HOLE STITCHING AND BARRING MACHINE.

No. 450,950. Patented Apr. 21, 1891.

WITNESSES.
A. P. Porter
J. T. Ball

INVENTORS.
James H. Reed
Charles A. Dahl
by their Attys
Clarke & Raymond (No Model.)　　　　　　　　　　　　　　　17 Sheets—Sheet 6.
J. H. REED & C. A. DAHL.
BUTTON HOLE STITCHING AND BARRING MACHINE.

No. 450,950.　　　　　　　　　　Patented Apr. 21, 1891.

WITNESSES.
A. P. Porter.
J. T. Ball

INVENTORS.
James H. Reed
Charles A. Dahl
by their Atty
Clarke L. Raymond

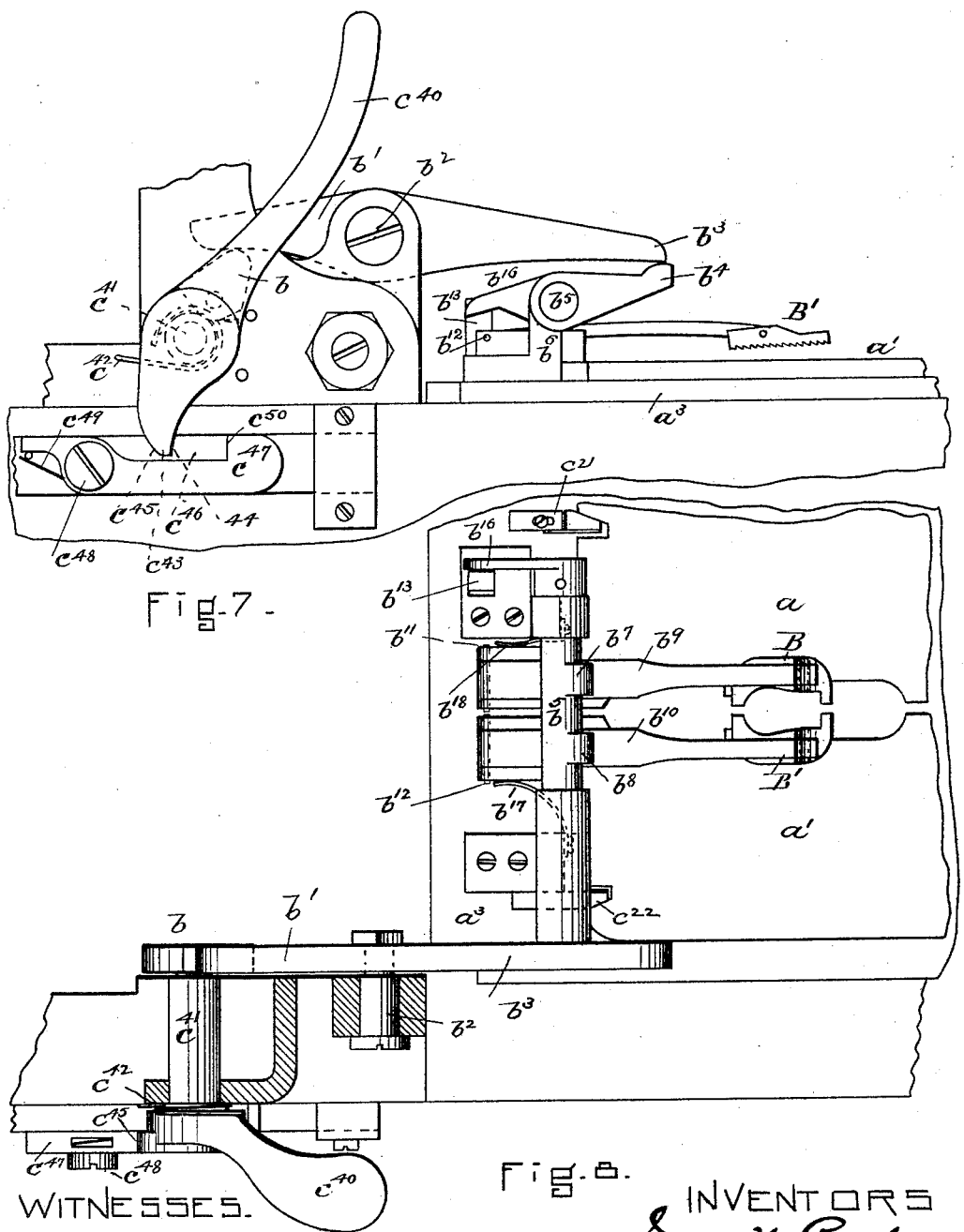

(No Model.) 17 Sheets—Sheet 8.
J. H. REED & C. A. DAHL.
BUTTON HOLE STITCHING AND BARRING MACHINE.
No. 450,950. Patented Apr. 21, 1891.
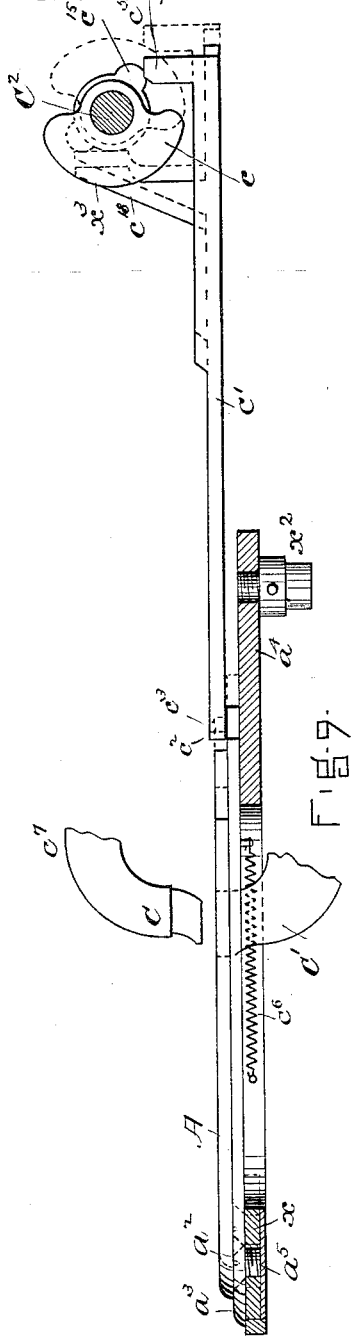
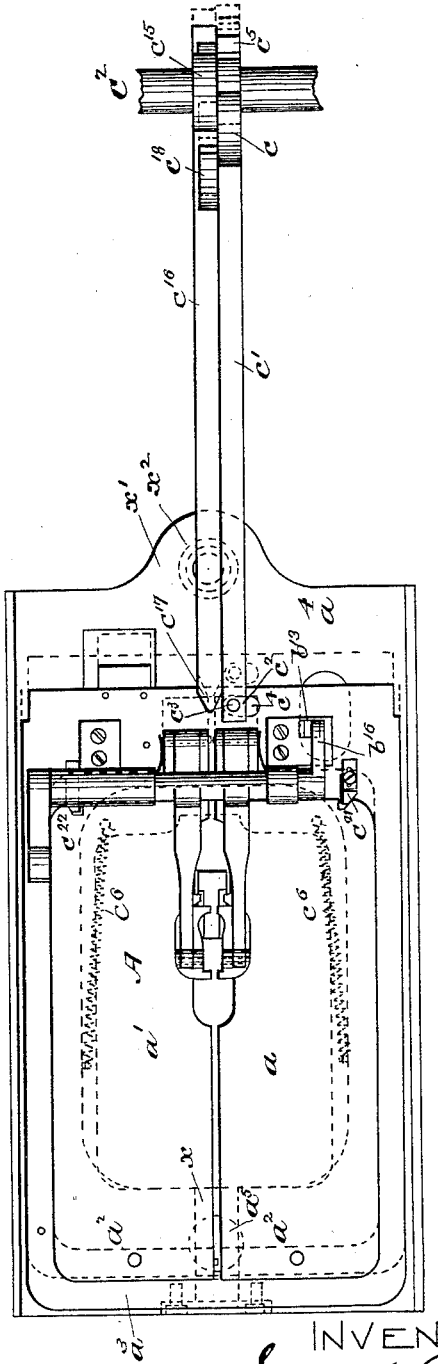
WITNESSES.
A. P. Porter.
J. T. Ball
INVENTORS
James H. Reed
Charles A. Dahl
by their Attys
Clarke & Raymond (No Model.)  17 Sheets—Sheet 10.
J. H. REED & C. A. DAHL.
BUTTON HOLE STITCHING AND BARRING MACHINE.

No. 450,950. Patented Apr. 21, 1891.

(No Model.) 17 Sheets—Sheet 11.
J. H. REED & C. A. DAHL.
BUTTON HOLE STITCHING AND BARRING MACHINE.

No. 450,950. Patented Apr. 21, 1891.

Fig. 18ᵃ.

WITNESSES.
A. P. Porter
J. T. Ball

INVENTORS:
James H. Reed
Charles A. Dahl
by their Attys
Clarke & Raymond

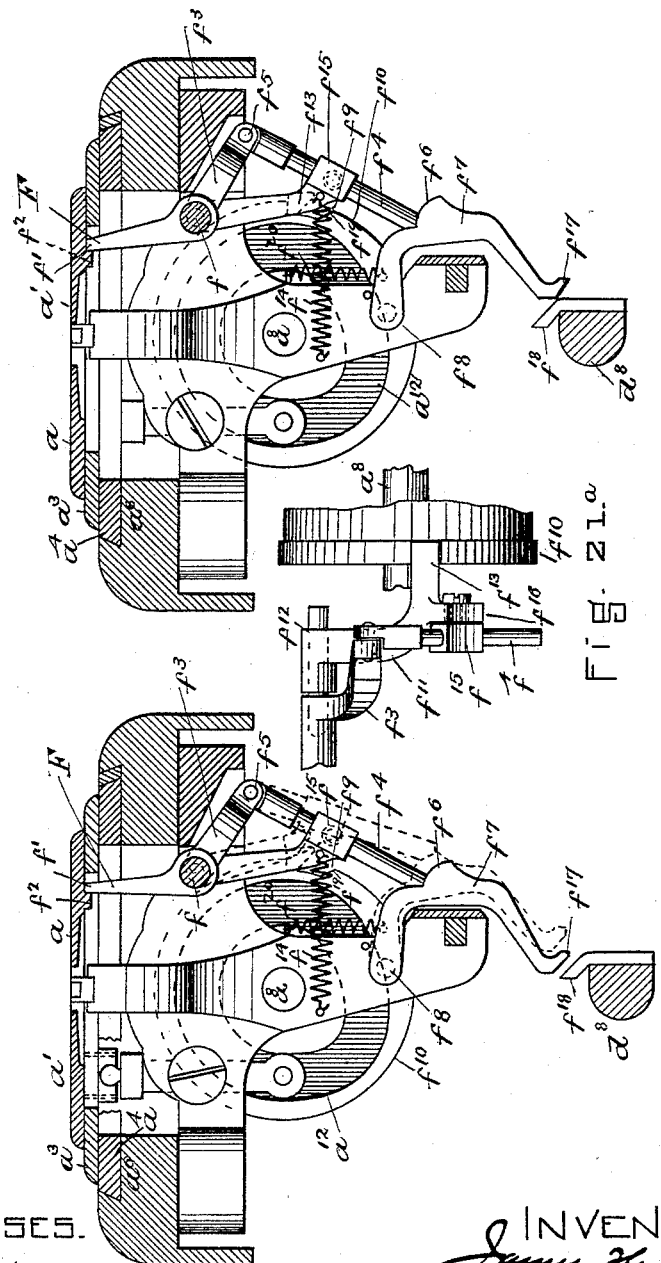

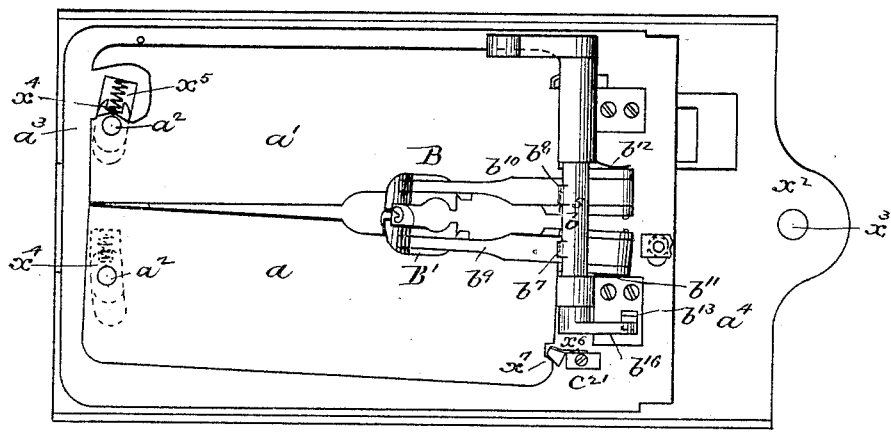

(No Model.)  17 Sheets—Sheet 14.

J. H. REED & C. A. DAHL.
BUTTON HOLE STITCHING AND BARRING MACHINE.

No. 450,950.  Patented Apr. 21, 1891.

WITNESSES.
A. P. Porter
J. T. Ball

INVENTORS.
James H. Reed
Charles A. Dahl
by their Atty's
Clarke & Raymond

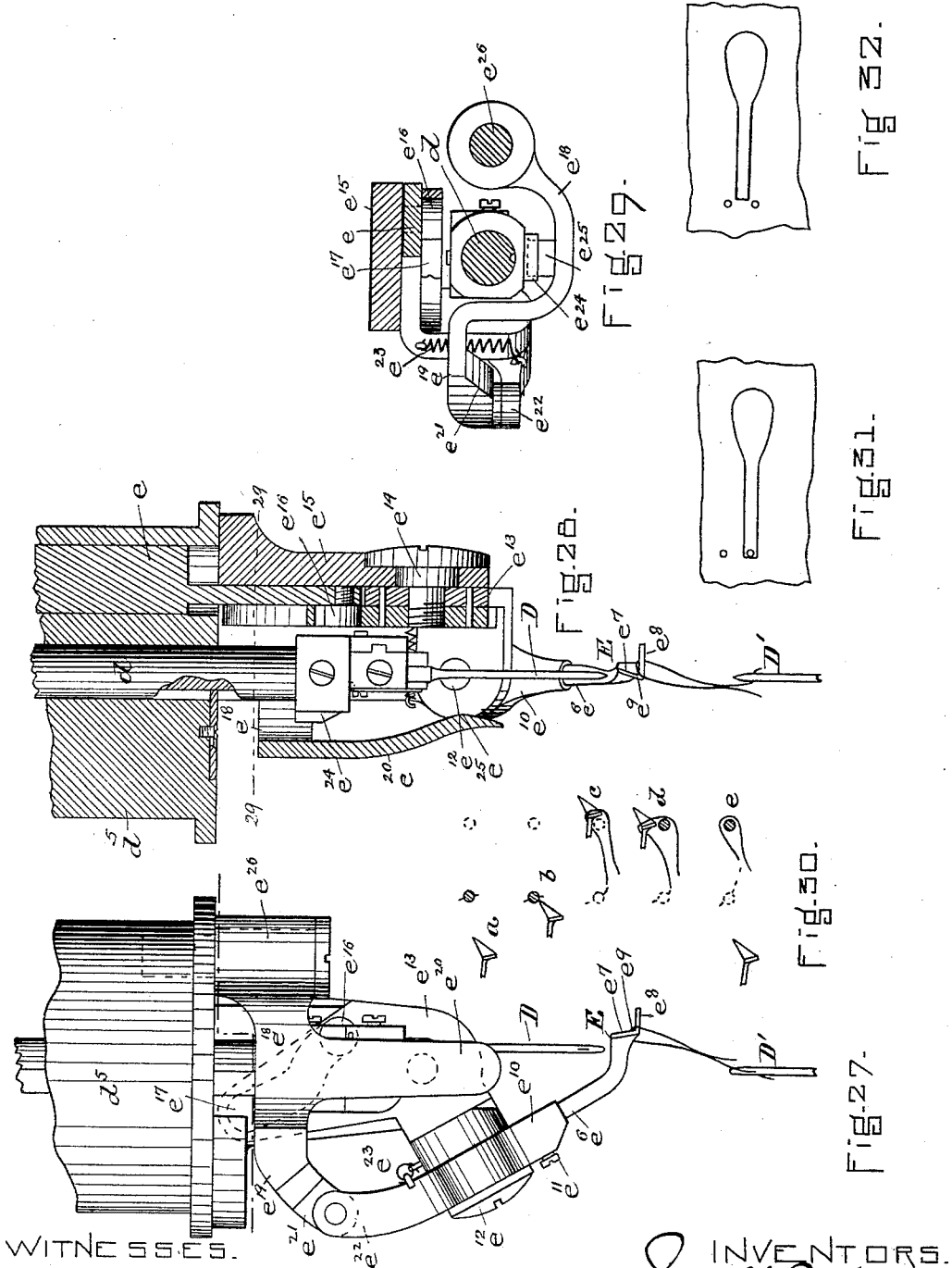

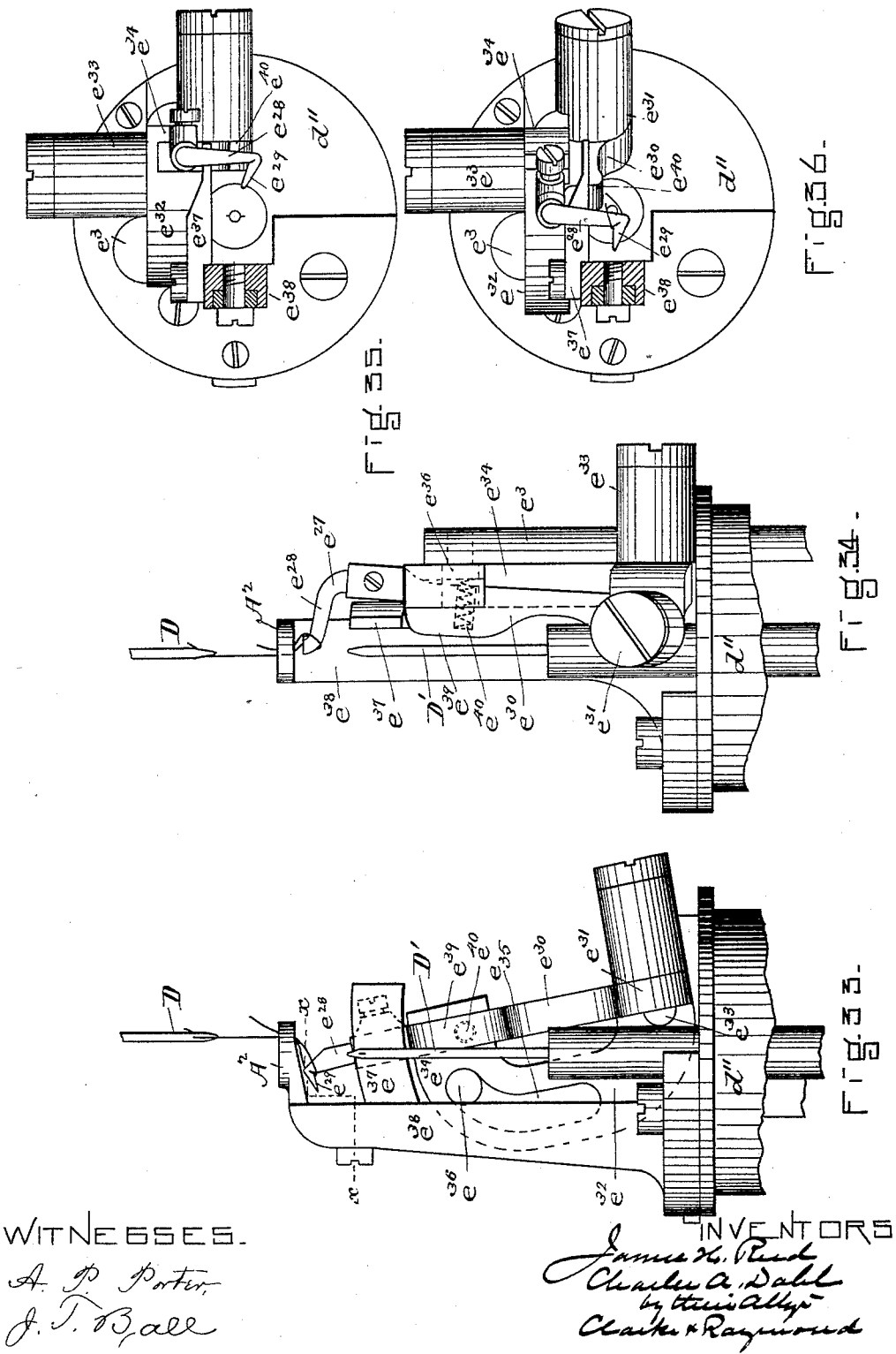

(No Model.)

J. H. REED & C. A. DAHL.
BUTTON HOLE STITCHING AND BARRING MACHINE.

No. 450,950. Patented Apr. 21, 1891.

WITNESSES.
A. P. Porter
J. T. Ball

INVENTORS.
James H. Reed
Charles A. Dahl
by their Attys
Clarke & Raymond

UNITED STATES PATENT OFFICE.

JAMES H. REED AND CHARLES A. DAHL, OF LYNN, MASSACHUSETTS, ASSIGNORS TO THE GLOBE BUTTONHOLE MACHINE COMPANY, OF KITTERY, MAINE.

BUTTON-HOLE STITCHING AND BARRING MACHINE.

SPECIFICATION forming part of Letters Patent No. 450,950, dated April 21, 1891.

Application filed April 21, 1890. Serial No. 348,858. (No model.)

*To all whom it may concern:*

Be it known that we, JAMES H. REED, of Lynn, in the county of Essex and State of Massachusetts, a citizen of the United States, and CHARLES A. DAHL, a subject of Oscar II, King of Sweden, now residing in said Lynn, have invented a new and useful Improvement in Button-Hole Stitching and Barring Machines, of which the following is a full, clear, and exact description, reference being had to the accompanying drawings, forming a part of this specification, in explaining its nature.

The invention comprises improvements in button-hole stitching and barring machines, and especially upon the mechanism described in our application for Letters Patent of the United States filed May 6, 1889, Serial No. 309,729.

It relates to button-hole cutting or slitting devices mounted upon a common frame with the stitching mechanism, but independently operated by separate belt or power and distinct starting and stopping mechanism; also, to the combination of said button-hole cutting or slitting devices with the starting mechanism of the button-hole-stitching devices and with said devices; also, to the loopers and their operating mechanism; also, to the construction and operation of the button-hole-barring devices; also, to various details of organization and construction, which will hereinafter be fully described.

Figure 5:
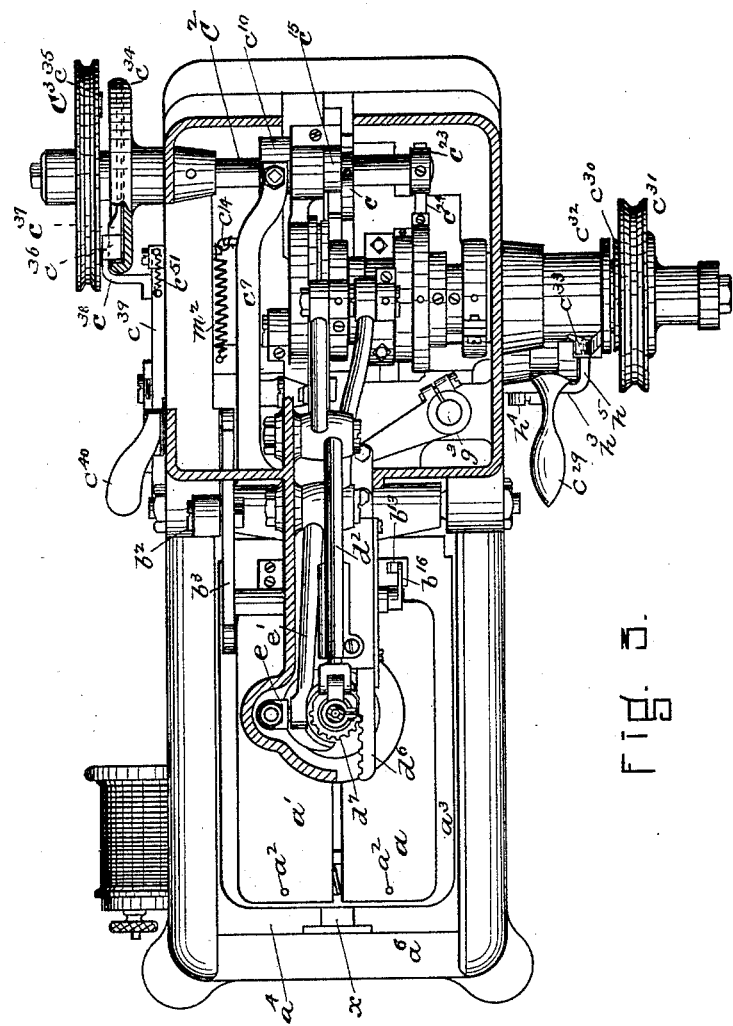
Figure 4:
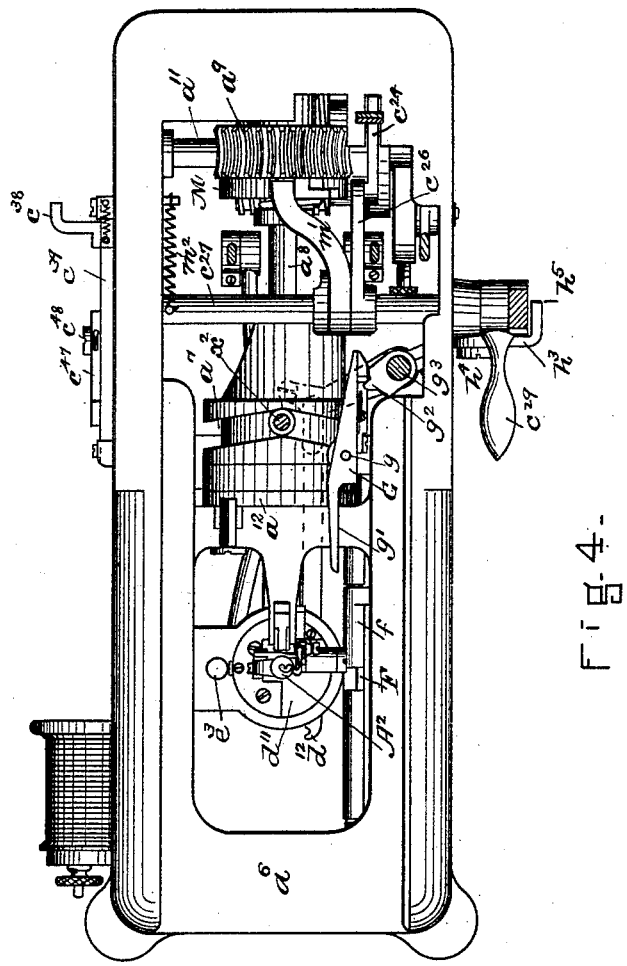
Figure 5:
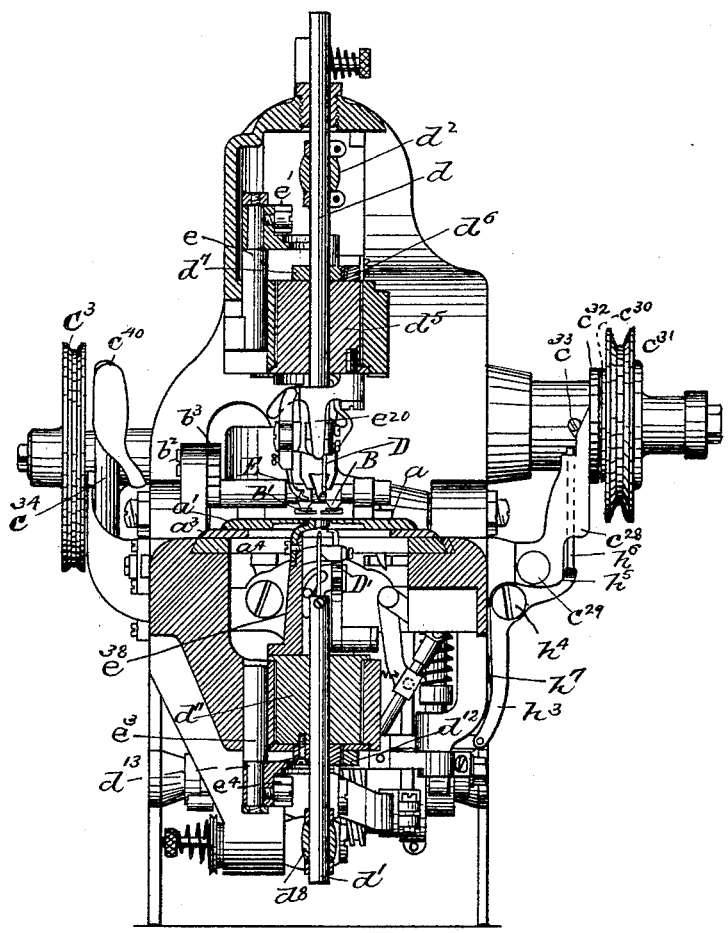
Figure 6:
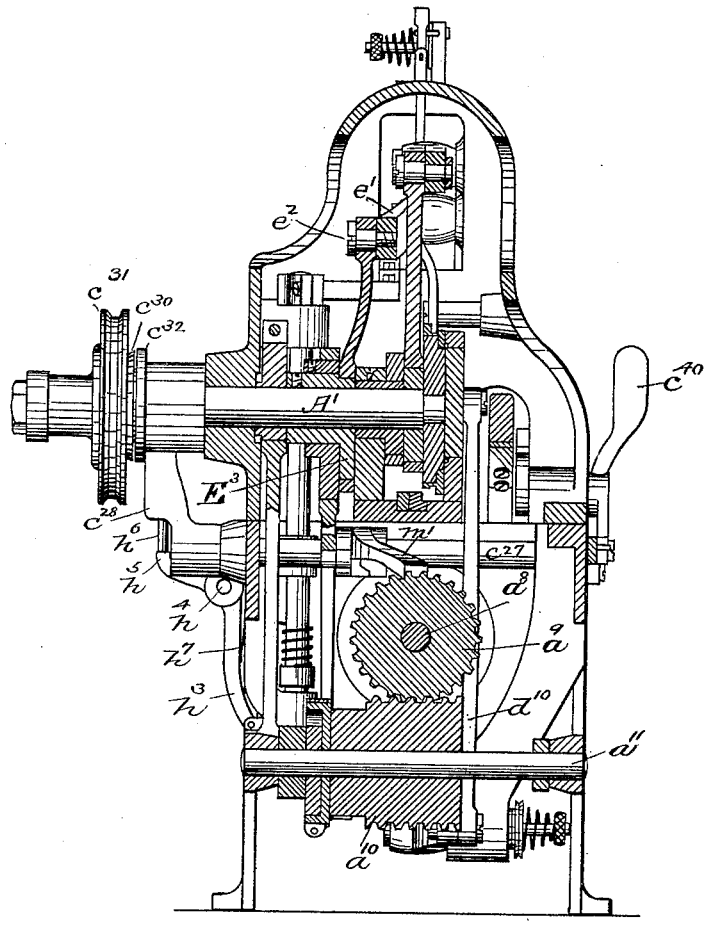
Figure 11:
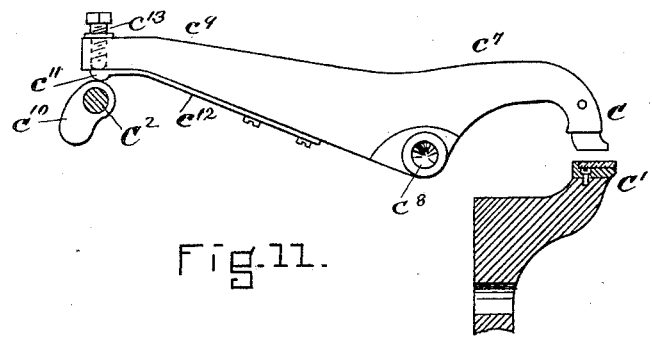
Figure 12:
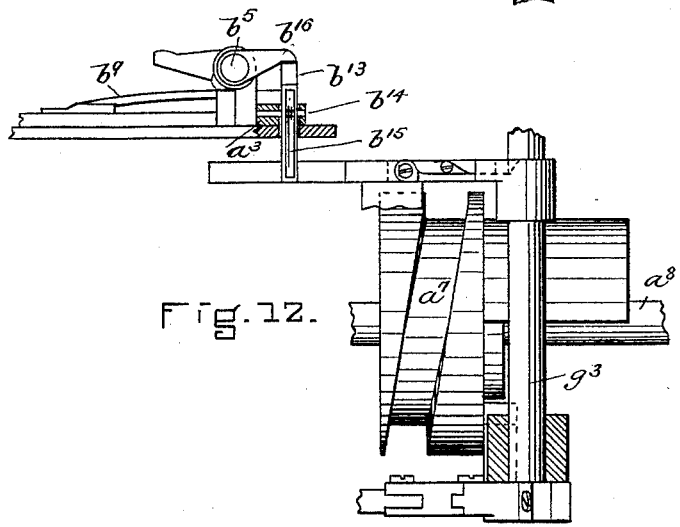
Figure 13:
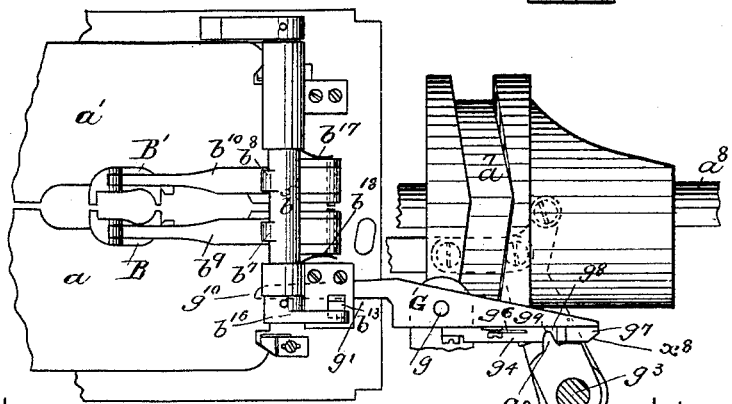
Figure 14:
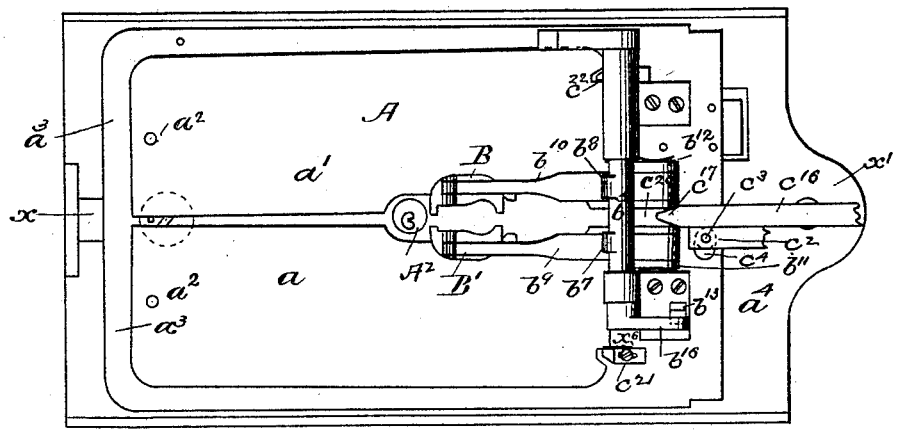
Figure 15:
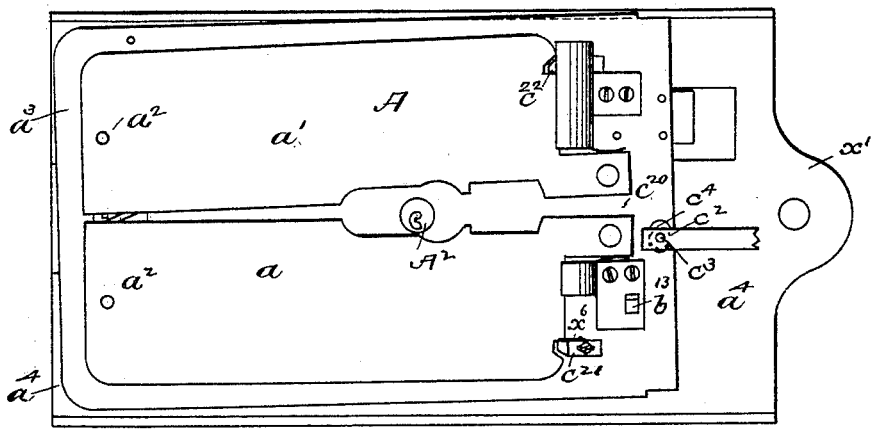
Figure 16:
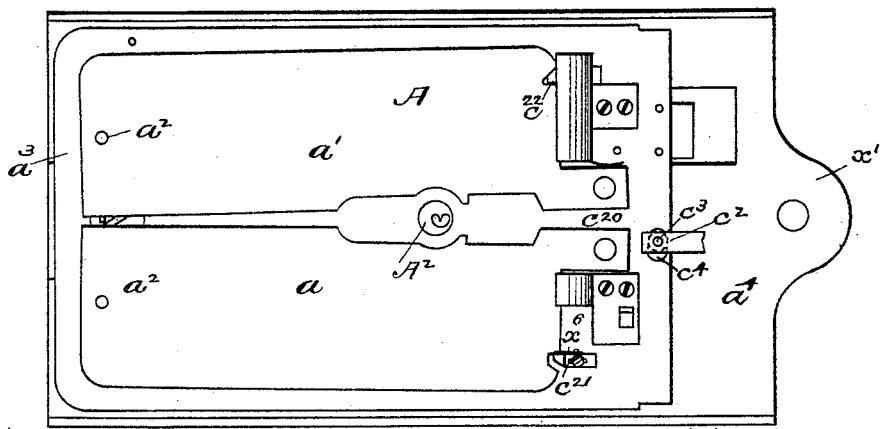
Figures 17, 18, 19, 20:
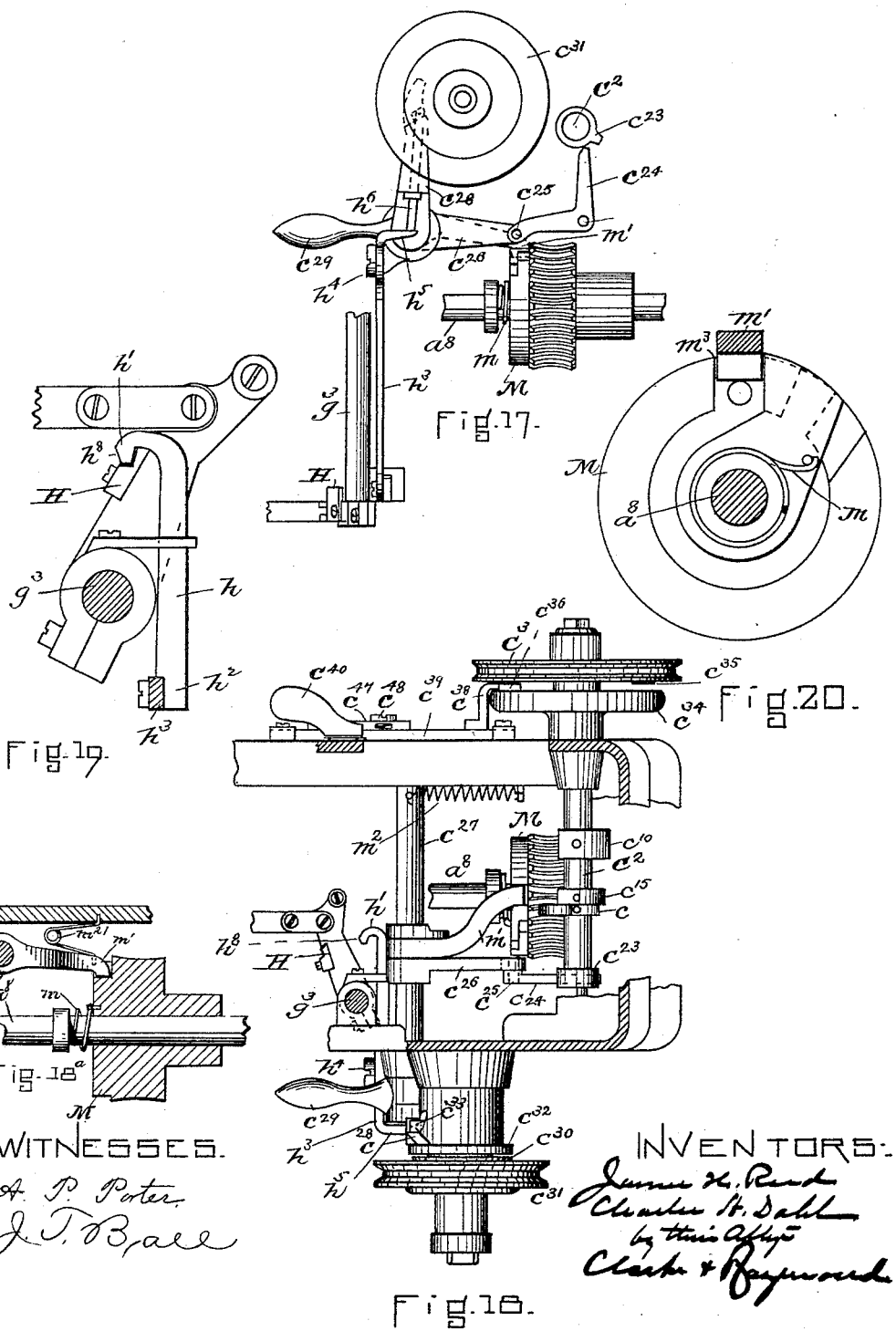
Figure 25:
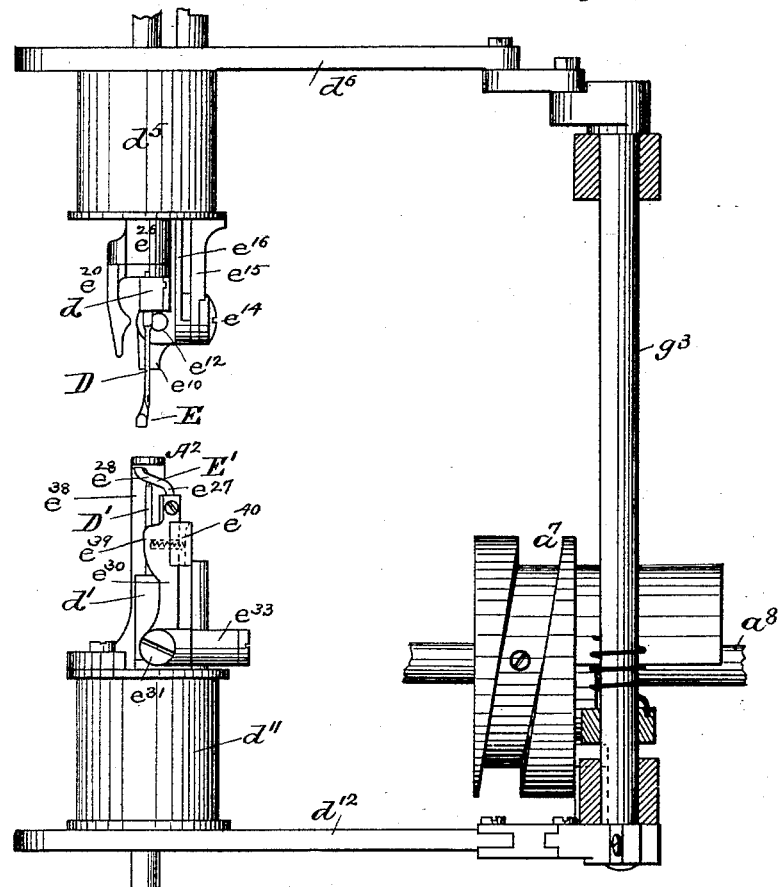
Figure 26:
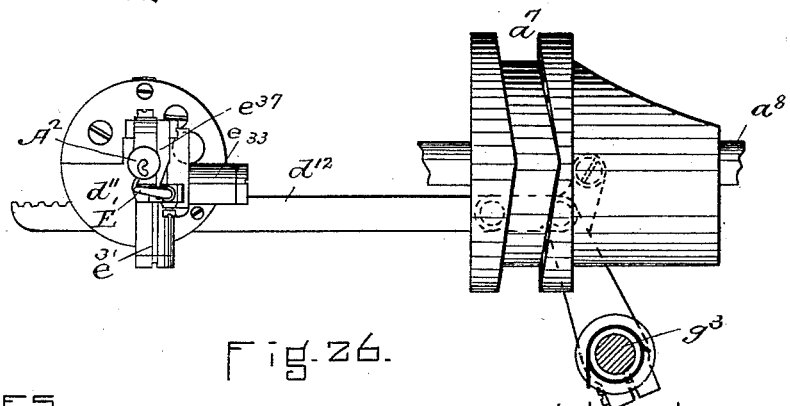
Figure 37:
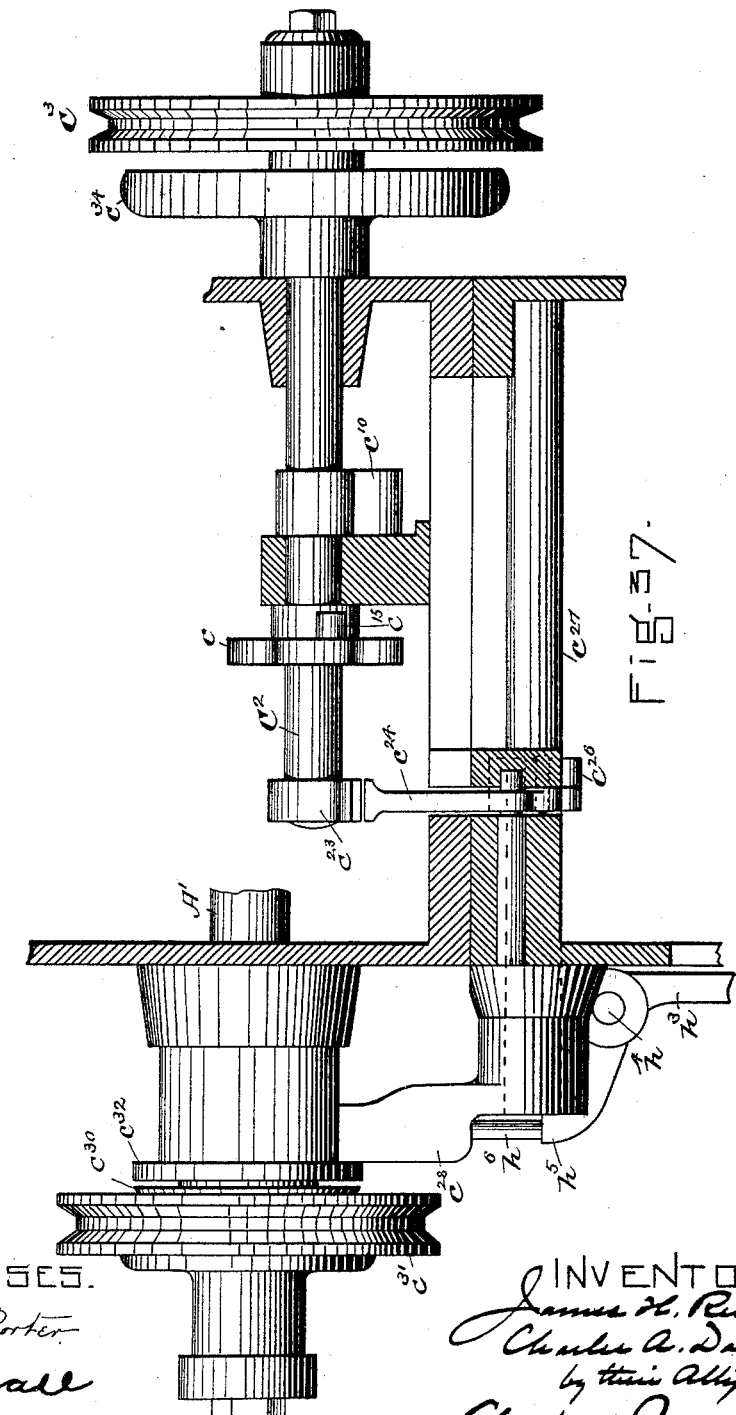

Referring to the drawings, Figure 1 is a view in right side elevation of our improved machine. Fig. 2 is a view in left side elevation thereof. Fig. 3 is a view in horizontal section upon the horizontal dotted line *x x* of Fig. 1 and in plan of the parts below said line. Fig. 4 is a view in horizontal section upon the horizontal dotted line *y y* of Fig. 1 and in plan of the parts below said line. Fig. 5 is a view in vertical section upon the vertical dotted line *z z* of Fig. 1. Fig. 6 is a view in vertical section upon the vertical dotted line *w w* of Fig. 1. Fig. 7 is a detail view, enlarged, in side elevation from the left side of the machine, representing the connection between the button-hole-cutting starting mechanism and the material-clamping mechanism. Fig. 8 is a detail view, enlarged, principally in plan, to further illustrate the clamping mechanism and the relation between it and the starting mechanism of the button-hole-cutting devices. Fig. 9 is a detail view, enlarged, in section and elevation, and Fig. 10 in plan, of the clamps, clamp-plate, &c., and their connection with a draw-cam upon the shaft of the button-hole-cutting mechanism. Fig. 11 represents in detail the button-hole-cutting mechanism and the cam for operating it. Fig. 12 is a view in detail, principally in elevation, of mechanism for releasing the clamp at the end of the stitching of the button-hole bar. Fig. 13 is a detail view, principally in elevation, of a portion of the clamp-releasing mechanism shown in Fig. 12. Fig. 14 is a view in plan principally of the clamp and clamp-plate mechanism, representing the button-hole after it has been cut, but before the operation of stitching, showing the clamps separated or spread from each other and the material on each side of the button-hole cut pulled apart to open the cut to afford room for the passage of the lower needle. Figs. 15 and 16 represent in plan various positions of the clamping-plate, to which reference will hereinafter be made. Fig. 17 is a detail view, principally in side elevation, of the devices for starting the stitching mechanism. Fig. 18 is a view in plan of the same. Fig. 18$^a$ is a detail to show the depressing-spring for the arm $m'$. Fig. 19 is a view in plan of the latch and connection for holding the rotary mechanism for rotating the needles and loopers after its operation and until released at the stopping of the machine to permit the needles and loopers to be returned to their original position. Fig. 20 is a view of a portion of the stopping mechanism of the stitching devices. Figs. 21 and 22 are views in cross-section and elevation showing mechanism for moving the clamp-plate, &c., in the operation of barring. Fig. 21$^a$ is a detail view of part of said mechanism. Fig. 23 represents in plan the position of the clamp-plates in barring. Fig. 24 is a view in perspective of the clamp-releasing mechanism. Fig. 25 represents in elevation the mechanism for turning the needle-supports and needles to enable them to sew about the eye of the button-hole. Fig. 26 is a view in plan of this mechanism. Fig. 27 is a view enlarged principally of the mechanism for operating the upper looper. Fig. 28 is a view principally in vertical section of said mechanism. Fig. 29 is a view in horizontal section upon the dotted line 29 29 of Fig. 28 and plan of parts below said line. Fig. 30 represents the various positions of the upper looper in relation to the upper and lower needles to show its course or movement in taking the loop, spreading it, and returning. Fig. 31 represents the positions which the needles bear to each other in relation to the button-hole before the beginning of the barring operation, and Fig. 32 the position which the button-hole and material bear to them during the barring of the button-hole. Fig. 33 is a view enlarged of the under-looper mechanism in the same relative position and view as the view of the upper looper shown in Fig. 27. Fig. 34 is a side view of the same. Fig. 35 is a horizontal section on line $xx$ of Fig. 33. Fig. 36 is a view upon the same section with the parts in their normal position. Fig. 37 is a view in rear elevation showing particularly the independent power-shaft and its cams.

Before giving a specific description of the various parts of the machine we will first describe it in a general way in order that the special function of its various parts may be better understood.

The first operation of the machine is to form the button-hole cut in the material. This is accomplished by mechanism which is independent of the stitching mechanism—that is, it is not operated by the stitching mechanism or by the starting device of the stitching mechanism, but by an independent device independently started—and this mechanism as embodied in the machine comprises a bed or anvil upon which the material is cut by the cutter, the cutter operated by a cam on the shaft of the cutting mechanism, the work-plate having a slide movement imparted to it, whereby the material is moved from the stitching position to a position between the anvil and cutter, and a connection between the starting-lever of the cutting mechanism and the clamps, whereby they are caused to clamp the material to the clamp-plate before they are separated to open the cut, and after the cutting of the hole the clamps are automatically spread to open the cut by a spreader operated by the cutting mechanism and before the stopping of the cutting mechanism, and the clamp and material are also automatically moved from the cutter to a position in operative relation to the stitching mechanism, so that at the first operation of the machine, the material having been placed upon the clamp-plate, the clamp-plate is moved into position beneath the cutting-knife, the clamps closed upon it, the knife operated, and the button-hole cut formed and spread and the clamp-plate and material returned to their original position, which is the stitching position. This is immediately followed by the action of the stitching mechanism, which may or may not depend upon that of the cutting mechanism. In the drawings the stitching mechanism is represented as started by a cam upon the shaft of the cutting mechanism, and upon such starting of the stitching mechanism the clamp-plate is given a forward movement in relation to the stitching devices upon one line, then a transferring movement during the stitching of the eye of the button-hole, and then a reverse movement upon the same line as the first to the end of the other side of the button-hole, when it is stopped and the clamps moved laterally a trifle and brought together to release the strain upon the fabric and permit a barring-stitch of the same length as that used for stitching the sides to be sewed across the end of the slit.

The stitching mechanism of the machine is represented as embodied in two straight eye-pointed needles, one reciprocating from above the work-clamp plate and the other from below, and looping devices having a peculiar construction and operation, which, with the needles, are adapted to be turned about the eye of the button-hole in stitching it and then making a half-revolution. Portions of the mechanism have been described in the said pending application, and we will only briefly allude to such parts here.

The clamp-plate A is made in two parts $a$ $a'$. Each part is pivoted at its front end $a^2$ (see Figs. 10, 14, 15, and 16) to a slide-plate $a^3$. The slide-plate carries the clamp-plates and also the clamps B B', and is in turn supported or carried by the slide bed-plate $a^4$, the said plate $a^3$ being pivoted at $a^5$ to a slide block or plate $x$, carried by the slide bed-plate $a^4$. (See Figs. 9 and 10.) The bed-plate $a^4$ is given lateral movements of feed and rest forward and back upon the bed $a^6$ of the machine by means of the cylinder-cam $a^7$ upon the shaft $a^8$, (see Fig. 4,) the bed-plate $a^4$ having an extension $x'$, provided with a cam-pin $x^2$, (see Figs. 9 and 10,) which enters the cam-groove of the cylinder-cam. The shaft $a^8$ is rotated by a worm-wheel $a^9$ (see Figs. 1, 2, 4, and 6) and a worm $a^{10}$ upon the shaft $a^{11}$, (see Fig. 6,) and movements of rotation and rest are provided this shaft $a^{11}$ by means of the connections between it and the power or driving shaft A', like those described in our said application. The rear end of the plate $a^3$ is moved upon the bed-plate $a^4$ transversely the line of movement of the said plate by a cam $a^{12}$ (see Fig. 4) upon the shaft $a^8$ and a connection between the plate and the cam similar to that described in our said application. The plate $a^3$ is arranged to slide upon the slide bed-plate $a^4$. This movement is imparted in one direction—that is, in a direction to bring the material between the anvil C and the cutter C'—by means of a cam $c$ (see Figs. 9 and 10) upon the power-shaft $C^2$, operating the button-holecutting mechanism, and a bar $c'$, connected at its ends $c^2$ (see Figs. 9, 10, and 37) by means of a pin $c^3$ with the plate $a^3$, the plate having a slot $c^4$, in which the pin extends. (See Fig. 10.) This form of connection between the plate and the draw-bar $c'$ permits the inner end of the plate to be moved laterally in relation to the end of the draw-bar. The draw-bar has its rear end $c^5$ extending upwardly into the path of the cam $c$, the cam being cut away, excepting that portion which operates to strike or move the draw-bar, to permit this section of the bar to be brought into operative relation with it. (See Fig. 9.)

It will be understood that the shaft $C^2$ makes but one complete revolution. Consequently when started it causes the cam $c$ to come in contact with the end of the draw-bar $c'$ and causes it to draw the plate $a^3$ upon the bed-plate $a^4$ sufficiently to move the material to be cut between the anvil and button-hole cutter; but after the cam is operated to so move the plate and material it is shaped to hold the plate and material in such position by continued contact of its surface $x^3$ with the end of the draw-bar until the button-hole cutter has operated to cut the material, when the cam leaves the end of the draw-bar and permits the springs $c^6$, which connect the plate $a^3$ with the plate $a^4$, (see Figs. 9 and 10,) to draw or move back to its original position the said plate $a^3$ and the draw-bar attached to it. The anvil C is stationary. The cutter C' is supported at the forward end of the lever $c^7$. (See Figs. 1, 2, 9, and 11.) This lever is pivoted at $c^8$ and has a backward extension $c^9$, (see Fig. 2,) which ends over the shaft $C^2$ in position to be operated by the cam $c^{10}$ thereon. (See Figs. 11 and 37.) The connection between the rear end of the lever and the cam is represented as established by a rounded steel piece $c^{11}$ at the end of a yielding or spring arm $c^{12}$, screwed to the under surface of the lever, (see Fig. 11,) and a set-screw $c^{13}$, which screws through a screw-hole in the end of the lever and bears upon the upper surface of the part $c^{11}$. This permits compensation of the parts to wear, and also an adjustment to vary the throw of the cutter, the set-screw serving to hold the bearing-section $c^{11}$ in any desired relation to the end of the lever. The spring $c^{14}$, attached to the frame and the back end of the lever $c^9$, serves to keep the end of the lever in contact with the cam and to elevate the front end and cutter C'. (See Fig. 2.) The shaft $C^2$ also carries a cam $c^{15}$. (See Figs. 9, 10, and 37.) This cam actuates a push-bar $c^{16}$, which has a wedge-shaped front end $c^{17}$ and a rear upward extension $c^{18}$, which extends into the path of the cam, so that the rotation of the cam causes the bar to be moved forward from the position to which it is moved by the movement of the clamp-plate to the button-hole cutter. The function of this bar is to separate the two members $a$ $a'$ of the clamp-plate and the clamps B B' immediately after the operation of the cutter in cutting the button-hole to put a strain or tension upon the material about the cut and to thus open the hole for the passage of the lower needle, the wedge end $c^{17}$ entering the space $c^{20}$ (see Fig. 14) between the two plates at their rear end and causing them to be pushed from each other until they come into contact, respectively, with the stops $c^{21}$ $c^{22}$, (see Figs. 10, 14, 15, and 16,) which are fastened to the plate $a^3$ and extend into notches or recesses formed in the sections $a$ $a'$. When the shaft $C^2$ is connected with the power-shaft A', driving the stitching mechanism, it carries the cam $c^{23}$ (see Figs. 17 and 37,) and this cam communicates motion through the bent lever $c^{24}$, pivoted at $c^{25}$ to the arm $c^{26}$, secured to a rock-shaft $c^{27}$, the other end of the shaft having a shipper-arm $c^{28}$ and a lever or handle $c^{29}$. (See also Fig. 1.) The shipper-arm $c^{28}$ extends upward, operates to disengage the driven member $c^{30}$ of the clutch from the driving member $c^{31}$ when moved into position to bring its end between the collar $c^{32}$ and the pin $c^{33}$, (see Fig. 5,) connected with the driven member of the clutch to operate it, and upon the removal of this shipping-lever from between the pin and the collar the driven member of the clutch is thrown or moved by a spring, as $m^2$, Fig. 18, or $m^{21}$, Fig. 18$^a$, into contact with the driving member, and the stitching mechanism is started. The cam $c^{23}$ upon the shaft $C^2$ serves to move the shipping-lever away from the pin, so that the stitching mechanism is automatically started. The handle $c^{29}$ is used for the same purpose, so that if the cam $c^{23}$ and connection with the shipping-lever be not used the stitching mechanism would be started by hand by the movement of the lever $c^{29}$. The stopping mechanism, which will be described later, operates to move the shipper into the path of rotation of the pin, and through it moves the driven member of the clutch from the driving member, which is shown as a pulley. The construction of the clutch and the operation of the shipper, so far as it relates to the action of the pin, is like that described in our pending application. The shaft $C^2$ also has the driving-pulley $C^3$, which forms one member of a clutch and the driven member $c^{34}$. (See Figs. 3, 5, 18, and 37.) The pulley $C^3$ is free to rotate upon the shaft. The clutch member $c^{34}$ is fixed to the shaft. A connection is established between the member $c^{34}$ of the clutch and the pulley $C^3$ by means of a lug or tooth $c^{35}$ upon the inner face of the pulley $C^3$ and a spring tooth or lug $c^{36}$ on the outer face of the driven member $c^{34}$. This spring tooth or lug $c^{36}$ is pushed outward from the surface of the driven member by a spring $c^{37}$ to a position to be in line with the path of rotation of the tooth or lug $c^{35}$ and is kept or maintained from such contacting position by means of a sliding finger $c^{38}$, (see Figs. 3 and 18,) attached to the slide-bar $c^{39}$ (see Figs. 2, 3, 4, 7, and 18) and adapted to be moved between the clutch member $c^{34}$ and pulley $C^3$ to be in line with the inclined or wedge surface of the spring or engaging tooth $c^{36}$ to push and hold it out of operative relation with the lug or tooth $c^{35}$. The shaft $C^2$ must make one full revolution. Therefore to start the shaft the finger $c^{38}$ is withdrawn from contact with the spring engaging tooth $c^{36}$; but in order to prevent a second rotation of the shaft it must be immediately returned. To enable this to be done automatically, the slide-bar $c^{39}$ is operated by a trip lever or handle $c^{40}$. (See Figs. 2, 7, 8, and 18.) This trip handle or lever is fastened to a short shaft at $c^{41}$ and is moved in opposition to the springs $c^{42}$, the spring acting to throw it into its forward position. The lower end $c^{43}$ of the lever is in the form of a finger or tooth having a straight or very nearly straight surface $c^{44}$ (see Fig. 7) and a rounded surface or end $c^{45}$. It enters a recess $c^{46}$ in a latch $c^{47}$. This latch is pivoted at $c^{48}$ to the slide-bar $c^{39}$ and has a downward movement thereon in opposition to the spring $c^{49}$, which acts to hold it in a horizontal position and with its shoulder $c^{50}$ in line with the end $c^{43}$ of the lever. There is also attached to the slide $c^{39}$ a spring $c^{51}$, (see Figs. 2 and 3,) which acts to draw the slide toward the back of the machine and the finger $c^{38}$ between the pulley $C^3$ and the driven member $c^{34}$ of the clutch. The shoulder of the latch $c^{47}$ is somewhat in advance of the center of the lever $c^{40}$, and upon the backward movement of the lever its lower end is moved forward, engages the shoulder of the latch by its surface $c^{44}$, maintains a contact therewith sufficient to move the slide in opposition to its spring $c^{51}$ until the finger $c^{38}$ has been drawn from contact with the spring-tooth $c^{36}$ of the clutch $c^{34}$, when the end $c^{43}$ of the lever becomes disengaged from the latch by reason of its having pushed the same as far as its movement upon an arc of a circle will permit, and rides off the shoulder above the same. This permits the spring $c^{51}$ to immediately return the slide $c^{39}$ and finger $c^{38}$ to their original or normal position, and this is accomplished before the shaft $C^2$ makes a full or complete rotation, so that as the spring-tooth $c^{36}$ approaches the end of its first rotation the finger is in position to bear against it and force or move it from contact with the tooth $c^{35}$. The lever $c^{40}$ is returned to its original position by the spring $c^{42}$, the end $c^{43}$ riding on its backward movement over the upper surface of the latch and depressing or moving it downward sufficiently to permit it to be returned to the position shown in Fig. 7. The lever $c^{40}$ not only serves to start the shaft $C^2$ and the mechanism it operates; but the operating movement thereof also closes the clamps B B' upon the fabric and clamp-plate. This is represented as accomplished by means of a cam $b$ upon the inner end of the shaft $c^{41}$ and lever $b'$, pivoted at $b^2$. (See Figs. 2, 7, and 8.) The front end $b^3$ of this lever is moved into contact with the lever $b^4$ upon a shaft $b^5$, carried by brackets $b^6$, attached to the slide or intermediate table $a^3$. This shaft $b^5$ has wiper-cams $b^7 b^8$, which upon the partial turning of the shaft are moved upon the upper surface of the spring-clamp-holding arms $b^9$ $b^{10}$, respectively. (See Figs. 1, 2, 7, 8, 13, and 14.) These clamp-holding arms carry the clamps B B' at their forward ends and are pivoted at their rear ends $b^{11} b^{12}$, one to the section $a$ of the clamp-plate and the other to the section $a'$ of the clamp-plate, so that they are movable with the said sections toward and from each other. (See Figs. 8 and 14.) The movement of the lever $c^{40}$ to start the shaft $C^2$ causes the forward end $b^3$ of the lever $b'$ to be moved downward upon the lever $b^4$. This turns the shaft $b^5$ and causes the cams $b^7 b^8$ to be moved upon the clamp-arms $b^9 b^{10}$ and to move the clamps B B' downward upon the material. This is before the two sections of the clamp-plate and clamp have been separated from each other to stretch the material about the button-hole. The cams $b^7 b^8$ are held locked in this position—that is, in position to hold the clamps B B' forcibly upon the fabric and clamp-plate—by means of a latch $b^{13}$, (see Figs. 1, 2, 3, 7, 8, 12, and 13,) which is pivoted at $b^{14}$ to the intermediate slide-plate $a^3$ to swing or move laterally, (see Fig. 12,) and which is moved by a spring $b^{15}$ to bring its upper end beneath the lever $b^{16}$, attached to the shaft $b^5$, when said shaft has been turned sufficiently to cause the cams to depress the clamps and to lift said lever $b^{16}$ above the line of movement of the stop $b^{13}$. This latch $b^{13}$ serves to hold the clamps depressed upon the clamp-plate during the subsequent operation of the stitching mechanism and until automatically released at the end of the stitching of the bar by a releasing device hereinafter described. The light springs $b^{17} b^{18}$, attached to the brackets carrying the shaft $b^5$, (see Figs. 8, 10, and 13,) bear against the lugs or ears to which the clamp-arms $b^9 b^{10}$ are respectively pivoted and exert a slight pressure upon the sections $a a'$ of the clamp-plate sufficient to tend to throw them toward each other or together when they are otherwise free to be moved into this relation.

Thus far we have described the mechanism dependent upon its operation or in part operated by the independent power-shaft $C^2$. This mechanism operates in this order and does the following things: First, the tripping of the clutch closes the clamps upon the fabric on the clamp-plate, which are automatically locked in their closed position; second, the rotation of the shaft causes the intermediate plate $a^3$, the clamp-plate, clamps, and material to be drawn backward into a position to be operated upon by the button-hole-cutting knife. The button-hole-cutting knife is then immediately operated to cut a hole and punch an eye in the material. Immediately after the cutting of the hole and eye the clamps are spread to stretch the material and open the hole. The intermediate plate $a^3$, clamp-plate, clamps, and material are then returned to their original position and are in operative relation to the stitching mechanism. The driven member of the clutch of the stitching mechanism is engaged with the driving member thereof and the stitching mechanism started, and the shaft $C^2$ then automatically stopped by disengagement of its driven clutch from its driving-pulley, and this shaft is not again rotated or operated during the operation of the stitching mechanism in stitching the button-hole.

We will now describe the novel features of the stitching mechanism.

D is the upper straight eye-pointed needle, and D' is the lower straight eye-pointed needle. They are reciprocated on parallel vertical planes, the upper needle being slightly offset from its needle-bar $d$ and from the center of rotation of the bar, while the lower needle D' is in line with the center of rotation of the lower needle-bar $d'$. (See Fig. 25.)

E is the upper looper, and E' the lower looper. The needles are reciprocated and turned in stitching the eye of the button-hole and the loopers turned with the needles in stitching the eye, as described in our said application, and, briefly stated, this mechanism is as follows: For reciprocating the upper needle and its needle-bar $d$ there is used the lever $d^2$, (see Fig. 1,) pivoted at $d^3$ (see Fig. 3) and operated through a link $d^4$ by a compound eccentric upon the shaft A'. The upper needle-bar is carried by the cylindrical block $d^5$, (see Fig. 5,) which is rotated or turned a half-revolution at the desired time—namely, during the stitching of the eye of the button-hole—by the rack-bar $d^6$, (see Figs. 1, 5, and 25,) which engages the pinion $d^7$, fastened to the block, and which has a forward step-by-step motion imparted to it by a rock-shaft and cam upon the cam-shaft $a^8$. The lower needle-bar $d'$ is reciprocated by means of the lever $d^8$, (see Figs. 1 and 2,) pivoted at $d^9$, an eccentric upon the shaft A', and a connecting-link $d^{10}$. The needle-bar is supported by the block $d^{11}$, which is rotated in unison with the block $d^5$ by means of a rack-bar $d^{12}$, (see Figs. 25 and 26,) which engages a pinion $d^{13}$, fast to the block $d^{11}$. This rack-bar is given a step-by-step movement forward or in one direction by means of the rock-shaft and cam above specified. These parts are fully described in our said application.

The upper-looper slide $e$ (see Figs. 3, 5, and 28) has a vertical movement imparted to it by the lever $e'$, (see Fig. 1,) pivoted at $e^2$ and actuated by an eccentric $E^2$ on the shaft A', and a connecting-link. The looper-slide $e^3$ of the lower looping mechanism is operated by the lever $e^4$, (see Figs. 1, 2, and 5,) pivoted at $e^5$ and connected with an eccentric $E^3$ on the shaft A' by a link. The slides $e\ e^3$, their reciprocating mechanism, and the manner of attaching them to the rotary blocks $d^5\ d^{11}$ are substantially the same as described in our said application, with this exception, that eccentrics are substituted for cams, and this change is of very material consequence, in that it permits the faster and more accurate running of the loopers and machine with less wear of the parts. The movements given the upper and lower loopers are the same, and the mechanism for imparting movements to them is similar. We will first fully describe the mechanism operating the upper looper and then briefly describe that operating the lower.

The looper E is well shown in Figs. 25, 26, 27, and 28, and it is formed with a straight shank $e^6$, a curved section bent at very nearly a right angle to the shank $e^6$ and having a slight laterally-turned flattened end $e^7$, from the lower edge of which extends a looper-point or shoe $e^8$, practically wedge-shaped in plan and quite thin. The path which this looper-point takes in relation to the needles is as follows: Starting from a position of rest at one side of the line of reciprocation of the lower needle, it passes by the front of the said needle, engages the loop, and, moving by a diagonal path across the plane of reciprocation of the lower needle and the plane of reciprocation of the upper needle, it engages the loop presented to it by the lower needle, which, riding on the wedge, is spread thereby and held by the shoulder $e^9$ while the upper needle moved down through the loop. The looper then, instead of moving backward upon the same path in which it was moved forward, follows a curved path back of the plane of reciprocation of the upper needle, releasing the loop as it moves, and then still following a curved track to the point of rest. In other words, it describes a long oval path or track about the planes of movement of the two needles and passes from outside of the lower needle to a point inside the upper needle at the time the two needles are separated or at that portion of their throw. This description applies to the movements of the looper and needles at the beginning of the stitching of the first side of the button-hole and before the stitching of the eye. To provide the looper with these movements, it is fastened by its shank to a lever $e^{10}$, the lower end of the lever having a hole which receives the shank of the looper, the shank being secured therein by a set-screw $e^{11}$. This lever is pivoted at $e^{12}$ to a rock-lever $e^{13}$, (see Figs. 27, 28, and 29,) and the rock-lever is in turn pivoted at $e^{14}$ to a bracket $e^{15}$, carried by the rotary block $d^5$. The rock-lever $e^{13}$ has movement imparted to it by means of the looper-slide $e$ and a cam-pin $e^{16}$ thereon, which enters a cam-groove or recess $e^{17}$ in an upwardly-extending arm of the rock-lever $e^{13}$, and this causes the rock-lever to be turned downward and upward upon a horizontal axis at the desired interval, and by this means the horizontal movement of the looper-point, or, more strictly speaking, its movement upon the arc of a circle across the planes of reciprocation of the needles, is obtained; but this, however, does not provide the looper-point with any variation as to its track or path, and this is obtained by means of a lever $e^{18}$, having the cam-arms $e^{19}$ $e^{20}$. The cam-arm $e^{19}$ has a guiding-surface $e^{21}$. Against this guiding-surface an arm $e^{22}$ of the lever $e^{10}$ is held by a spring $e^{23}$. The shape of this guiding-surface of the cam $e^{21}$ is such that upon the movement of the end of the lever $e^{22}$ upon it it causes the lever $e^{10}$, and therefore the looper, to be moved upon an arc of a circle in one direction, and this movement upon the forward movement of the looper causes the looper to take the curved path in relation to the needles above spoken of. In order that the looper may not return by the same path by which it advanced, it is necessary that this cam $e^{21}$ be moved after the looper has reached the end of its forward movement, and to accomplish this the lever $e^{18}$, which supports it, is caused to be moved by means of a projection or cam $e^{24}$ on the needle-bar, which comes in contact with the cam-surface $e^{25}$ on the arm $e^{20}$ and moves the lever $e^{18}$ sufficiently to move the cam $e^{21}$ at the time when the looper is about to make its return movement. This moves the cam $e^{21}$ into a different plane or position and causes the looper to be slightly transferred and return upon a different path from that in which it was advanced, as a contact is maintained between the needle-bar cam $e^{24}$ and the cam $e^{25}$ on the arm $e^{20}$ sufficiently long to permit of a portion of the return movement of the looper and the lifting of the end of the lever $e^{22}$ upon the cam $e^{21}$, while the cam $e^{21}$ is thus held in its second position. The lever $e^{18}$ may of course be a slide, if desired. It is pivoted at $e^{26}$ to the block $d^5$ and is rotated therewith. The position which the looper bears at its point of rest preparatory to engaging the loop of the lower needle is represented at $a$, Fig. 30. Its position when partially advanced to engage the loop is represented at $b$, Fig. 30. Its position after it has engaged the loop and has advanced through the planes of movement of the two needles to spread the loop and present it to the upper needle is represented at $c$, Fig. 30. The first position upon its return movement, or that which it takes to move the point backward from the upper needle to drop the loop, is represented at $d$, Fig. 30, and from that point it takes an oval path to the point of rest or position represented at $e$, Fig. 30.

The lower looper E' (see Figs. 33, 34, 35, and 36) has a shank $e^{27}$ and a curved section $e^{28}$, which is somewhat flattened at its end, and from which extends laterally a looper-point $e^{29}$, the looper-point extending from the end of the section $e^{28}$ at an acute angle and being thin in plan and wedge shape in elevation, having a straight under edge and a tapering upper edge. (See Fig. 33.) It is held by the lever $e^{30}$, which is pivoted at its lower end $e^{31}$ to a second lever $e^{32}$, and this lever $e^{32}$ is pivoted at $e^{33}$ to the lower rotary block $d^{11}$. This lever has a cam-plate extension $e^{34}$, in which is a curved cam-groove or slot $e^{35}$, and a cam-pin $e^{36}$ at the upper end of the looper-slide $e^3$ enters this cam-recess or slot and gives movement to the lever at the proper interval of time. This causes the looper to be advanced and retracted. To give it the lateral movement in relation to the upper and lower needles necessary, there is used a cam-plate $e^{37}$, fastened to the block $e^{38}$, carrying the button $A^2$, and the upper end of the lever $e^{30}$ is moved into contact with the cam-plate upon its forward movement, which causes the looper-point to be deflected from what otherwise would be a straight line. Upon the reverse or backward movement of the looper the lever is disengaged from the cam-plate which guided it during its outward movement by the contact of the lower needle-bar with a projection $e^{39}$ upon the lever $e^{30}$. This moves the lever and looper-point laterally, so that the return movement is made in a different path from that of the advance movement, and this path is maintained until the lever and looper finally come to rest. A spring $e^{40}$ serves to maintain the lever in contact with the guide cam-plate $e^{37}$ and with the needle-bar. This mechanism for operating the loopers is simple and easy, strong, and not liable to get out of order. It will be understood, of course, that at the stopping of the machine the rotary blocks $d^5$ $d^{11}$, the needles, and loopers are returned to their original position by a spring or springs acting through the rack-bars, as described in our said application.

The button-hole is barred by a stitch of the same length as that used in stitching the sides. To enable it to be used, the clamp-plate is provided with a slight lateral movement sufficient to move the material relatively to the needles to bring them upon opposite sides of the button-hole cut, and at the same time one section of the clamp-plate is moved toward the other to relieve the fabric from the straining action to which it has been subjected during the stitching of the sides and eye and to cause it to be brought together at the barring end of the button-hole in the form of a slight ridge or pucker, and the bar is sewed while the material is thus held, as many stitches being used as required. Of course these movements of the clamp-plate are automatic and do not interfere or stop the operation of the stitching mechanism. The means by which the clamp-plate is thus moved to shift the material transversely and bring together the sections of the clamp are shown in Figs. 21 and 22 and comprise a lever F, attached to a rock-shaft $f$. The upper end $f'$ of this lever is in a position opposite a lug $f^2$, projecting downward from the section $a$ of the clamp-plate at the time of its operation. The rock-shaft $f$ is turned at the required interval by means of a lever $f^3$, a link $f^4$, connecting its end $f^5$ with said lever $f^3$ and at its opposite end with an incline $f^6$ on a lever $f^7$, pivoted at $f^8$, and by means of the cam-recess $f^9$ in the edge cam $f^{10}$ and a lever $f^{11}$, pivoted at $f^{12}$, having its outer end $f^{13}$ held in contact with the edge of the cam $f^{10}$ by a spring $f^{14}$. This lever $f^{11}$ is connected with the rod $f^4$ by a box $f^{15}$, arranged to swivel or turn upon a lug $f^{16}$ of the lever $f^{11}$. The rod $f^4$ is free to slide in this box. At the end of the stitching of the last side of the button-hole the cam-recess $f^9$ comes in line with the end $f^{13}$ of the lever and allows the lever to be moved by the spring $f^{14}$ inwardly a limited distance. This movement of the lever inward draws the rod $f^4$ from the position represented in dotted line in Fig. 21 to that shown by the full line and into and up upon the incline $f^6$ upon the lever $f^7$. This moves the lower end $f^{17}$ of the lever $f^7$ into a position to be engaged by a section of or plate $f^{18}$ upon the lower needle-lever, and upon the upward movement of the needle-lever $d^8$ the lever $f^7$ is moved upwardly, thereby giving a movement to the rod $f^4$, which in turn, through the lever $f^3$, turns the shaft $f$ sufficiently to cause the lever F to move the section $a$ of the clamp-plate transversely not only sufficiently to release the tension upon the material caused by the clamps, but to form a pucker therein and to move the other section or part of the clamp $a'$ over, where it remains until the clamps are released. As many barring-stitches as may be desired are sewed, and the rod $f^4$ is then disengaged from the lever $f^7$ by the inclined section $f^{19}$ of the cam operating to lift or throw out the lever $f^{11}$, which causes the rod $f^4$ to be moved from the lever $f^7$ and allows the spring $f^{20}$ to move the said lever out of operative relation with the rod and with the lower-needle-bar lever. (See dotted outline, Fig. 21.) To press the clamp-plates toward each other at their front ends, we arrange the pivot-holes which receive the pivots $a^2$ in slide-blocks $x^4$, (see Fig. 23,) arranged in recesses in the front cross-bar of the intermediate plate $a^3$, and these slide-blocks are movable in the slides in opposition to the springs $x^5$. This construction is desirable to permit the lateral movement of the plates in barring and for the purpose of returning them to their normal position. To permit the movement of the plates in barring, it is also necessary that the front stop $c^{21}$ be attached to a spring $x^6$, so as to be movable in the direction in which the clamp-plates are moved in barring, (see Fig. 23,) the movement of the section $a'$ of the plate being such as to bring the surface $x^7$ of the recess in contact therewith and requiring that it should have a slight movement with the plate to permit the plate to be sufficiently moved. To automatically release the clamp-latch $b^{13}$ at the stopping of the stitching mechanism, we employ a lever G, (see Figs. 4 and 24,) which is pivoted at $g$, and the edge $g'$ of which is in contact with the stop $b^{13}$ near its lower end, but not connected with it. This permits the horizontal movement of the stop with the plate $a^3$. The edge $g'$ of the lever G is moved against the lower end of the stop $b^{13}$ at the end of the operation of the barring mechanism by means of the tappet $g^2$ on the shaft $g^3$, which operates the rack-bars. There is attached to the lever G a latch-bar $g^4$, which is pivoted thereto at $g^5$, swinging downward in opposition to the spring $g^6$. This latch-bar has a latch $g^7$. The tappet $g^2$ has a shoulder $g^8$ and the rounded surface $g^9$. (See Fig. 13.) The movement of the tappet in one direction as the racks are moved causes it to come in contact with the latch $g^7$ and depress it without moving the lever G, and the tappet is moved sufficiently to clear the projection $g^7$ or latch, which is then moved up in line with it by the spring $g^6$. Upon the reverse movement of the tappet the tappet-surface comes in contact with the latch, does not depress it, rides upon its beveled end, and throws the end of the lever away from it until it rides by the same. It will be seen that the latch $g^7$ has, in addition to the side bevel at its outer end, the inclined shoulder $x^8$ at its forward end, upon which the tappet rides in depressing it to pass by it upon the feed movement of the rack-bars. This causes the end $g^{10}$ of the lever to be moved sufficiently to move the clamp-latch $b^{13}$ from locking engagement with the lever $b^{16}$ and permits the clamps to be released.

While the cam which operates the rack-bars $d^6$ $d^{12}$ holds them after they have turned the blocks $d^5$ $d^{11}$, needles, and loopers until about the time the machine has stopped, we have also used a latching device which holds the rack-bars in the position to which they have been moved in turning these blocks, needles, &c., until released at the very instant of the stopping of the machine and after the needles have been withdrawn from the work after the last stitch. This mechanism is represented in Figs. 1, 17, 18, 19, and 20, and it embraces a latch H, carried upon the lower arm of the rack-lever operating the rack-bars, and a slide-rod $h$, having a latch-engaging hook end $h'$. This rod $h$ is attached at its end $h^2$ to the bent lever $h^3$, pivoted at $h^4$, (see Fig. 5,) and the arm $h^5$ is bent to come in line with a push-rod $h^6$, carried by the stop-shipper $c^{28}$. (See Figs. 1, 5, and 17.) A spring $h^7$ bears against the lower arm of the lever $h^3$ and serves to hold outward the latch-bar $h$ and the push-bar in a position to be engaged by the stop-pin $c^{33}$, attached to the driven member of the clutch, when the shipper has been moved into position to stop the machine, the pin being of sufficient length to come into contact with the upper end of the push-rod $h^6$ and push the same downward, thereby causing the lower end of the lever $h^3$ to be moved inward and the latch $h'$ to be disengaged from the catch H. The engagement between the latch $h'$ and the catch takes place at the end of the backward movement of the rack-bars. The catch comes in contact with the inclined surface $h^8$ of the latch and moves it inward sufficiently to permit the catch to ride past it, when the spring draws the latch into engagement with the catch, as represented in Fig. 19. The stitching mechanism is stopped automatically by means of the stop-wheel M upon the shaft $a^8$. (See Figs. 4, 17, 18, and 20.) This stop-wheel has a limited independent rotation upon the shaft of between an eighth and a sixteenth of a revolution in opposition to the coil-spring $m$. There is attached to the rock-shaft $c^{27}$ a lever or arm $m'$, (see Fig. 18,) which has a slight movement upon the shaft $c^{27}$, and it is held in contact with the edge of the stop-wheel M by a spring $m^2$, Fig. 18, or $m^{21}$, Fig. 18$^a$. There is in the stop-wheel a recess $m^3$, extending inward from its edge. Upon starting the sewing mechanism the partial rotation of the shaft $c^{27}$ moves the lever $m'$ from the recess $m^3$ of the stop-wheel. The instant it is moved beyond the edge of the wheel the coil-spring $m$ causes the wheel to be turned, immediately removing the recess from below the lever and bringing the edge of the wheel in position to receive it. This prevents the return of the lever $m'$ to the recess $m^3$ until the wheel has made a complete revolution, when the end of the lever drops into the recess $m^3$, and, acting through the rock-shaft $c^{27}$, moves the shipper $c^{28}$ into position to move the driven member of the clutch from the driving member. On account of the time which it takes to transmit this movement the machine does not come to rest until the shaft bearing the stop-wheel M has turned somewhat sufficiently to cause the stopping of the rotation of the wheel M to produce tension in the spring $m$.

We would not be understood as limiting ourselves to the precise form of construction herein described, but may use in lieu thereof any mechanical equivalents capable of providing like movements to the working parts.

The operation of the machine is as follows: The material is placed upon the clamp-plate beneath the clamps. The movement of the operating-lever $c^{40}$ first clamps the material upon the clamp-plate, the clamps being automatically latched thereon, and then starts the supplemental shaft $C^2$. The intermediate bed, clamp-plate, clamps, and material are then automatically drawn to the button-hole-cutting mechanism, the button-hole slit and eye are immediately cut, the sections of the clamp-plate and clamp automatically spread or separated to open the button-hole cut, the intermediate plate, clamp-plate, clamps, and material returned to the stitching position, and the stitching mechanism immediately started, and, if the said power-shaft $C^2$ is connected with the mechanism of the stitching devices, the stitching devices are automatically set in operation and the stitching of one side of the button-hole begins, the lower needle plying in the button-hole slit and the upper needle through the material. The clamp-plate, clamps, and material then have a step-by-step feed movement in an outward direction, or toward the front of the machine, during the stitching of the straight portion of this side of the button-hole. The feed movement of the clamp-plate, clamps, and material then becomes slower, and an additional traversing movement is at the same time imparted to the clamp-plate, clamps, and material, and at the same time the needles and looping devices begin to rotate. This rotation and traversing movement of the clamp-plate, &c., is continued until the eye of the button-hole has been stitched, when the movement of the clamp-plate, &c., is step-by-step inward, or away from the front of the machine, and the needles and their looping devices then bear a position the reverse of that occupied at the stitching of the first side. This position is maintained until the end of the stitching of the last side of the button-hole, when the stretching action of the clamps upon the fabric is released by the movement on one section of the clamp-plate and its clamp toward the other clamp-plate and clamp sufficiently not only to release this tension upon the fabric, but also to move the other section of the clamp-plate and its clamp somewhat and to form a pucker in the material at the bar. The sewing mechanism still continues and sews a barring-stitch of the same length as the other stitches, both needles then passing through the fabric. As many of these barring-stitches are taken as desired, and the stitching mechanism is then automatically stopped, the clamps automatically released, the rack-bars released, and the needles and loopers automatically turned a half-revolution to their original position.

When no connection is used between the power-shaft $C^2$ and the starting mechanism of the sewing devices after the operation of clamping the material, moving the plate to the button-hole cutter, cutting the button-hole, spreading the clamps and material, and returning the material and clamps to their original position, the machine comes to rest, and the stitching mechanism is independently set in operation by a movement of the operating-lever $c^{29}$.

The manner of leading the threads to the stitching mechanism is practically the same as in ordinary stitching-machines, and the tension devices are substantially like those described in our said application.

Having thus fully described our invention, we claim and desire to secure by Letters Patent of the United States—

1. In a button-hole cutting and stitching machine, the combination of the button-hole-cutting mechanism, means, such as a belt, for actuating the same, a start-motion device therefor and a stop-motion device therefor, a starting-lever to actuate the start-motion, a movable clamp-plate and clamps carried thereby actuated by a device like a cam upon the shaft of the button-hole-cutting mechanism, and devices connecting the clamps with the actuating-lever of the start-motion, whereby upon its movement to start the machine the clamps are caused to be moved upon the work, substantially as described.

2. The combination, in a button-hole cutting and stitching machine, of the stitching mechanism and an automatic button-hole cutter, means independent of the stitch-forming mechanism for operating said cutter, and a clamp-plate and clamps having an automatic movement toward and from the button-hole cutter, and an automatic clamp-spreader to spread the clamps after the operation of the cutter and operated by mechanism independent of the stitching mechanism, as and for the purposes described.

3. The combination, in a button-hole cutting and stitching machine, of stitching mechanism and an automatic button-hole cutter, means independent of the stitch-forming mechanism for operating said cutter, the clamp-plate, the clamps, mechanism for moving the clamps upon the clamp-plates, and an automatic lock or latch for holding said clamps depressed, operated independently of the stitching mechanism, substantially as described.

4. The combination, in a button-hole cutting and stitching machine, of the stitching mechanism, an automatic button-hole cutter, means independent of the stitch-forming mechanism for operating said cutter, a clamp-plate having automatic movements toward and from the cutter, the clamps and mechanism connecting them with the starting-lever, whereby the movement of the starting-lever causes the clamps to be depressed upon the clamp-plate, an automatic latch or lock for latching the clamps in their depressed position, and an automatic clamp-spreader for spreading the two sections or parts of the clamp after the operation of the button-hole-cutting mechanism, all operating independently of the button-hole-stitching mechanism, as and for the purposes described.

5. The combination, in a button-hole cutting and stitching machine, of a shaft independent of the button-hole-stitching mechanism, button-hole-cutting mechanism actuated thereby, the stitching mechanism, and driving and driven members of a clutch upon said shaft, and mechanism for disengaging the driving from the driven member upon one revolution thereof, substantially as described.

6. The combination, in a button-hole cutting and stitching machine, of the stitching mechanism, a power-shaft and means for rotating it independently of the stitching mechanism, a hand starting and automatic stopping mechanism therefor, a cam upon said shaft for operating the button-hole cutter, the said button-hole cutter and a lever connecting it with said cam, a cam upon said shaft connected with the clamp-plate for moving it to the button-hole cutter, the said clamp-plate, and means for connecting it with its operating-cam, as and for the purposes described.

7. The combination, in a button-hole cutting and stitching machine, of the stitching mechanism, a power-shaft and means for rotating it independently of the stitching mechanism, a hand starting and automatic stopping mechanism therefor, a cam upon said shaft for operating the button-hole cutter, the said button-hole cutter and a lever connecting it with said cam, a cam upon said shaft connected with the clamp-plate for moving it to the button-hole cutter, the said clamp-plate and means for connecting it with its operating-cam, and springs for moving the clamp-plate in a direction the reverse of that in which it is moved by the cam, as and for the purpose described.

8. The combination, in a button-hole cutting and stitching machine, of the stitching mechanism and its operating-shaft, a power-shaft and means for operating it independent of the device for operating the stitching mechanism, a hand starting and automatic stopping mechanism therefor, a cam upon said shaft for operating the button-hole cutter, said button-hole cutter and a lever connecting it with said operating-arm, a cam upon said shaft connected with the clamp-plate for moving it to the button-hole cutter, said clamp-plate, a third cam upon said shaft connected with and operating a clamp-spreader, and said clamp-spreader, substantially as described.

9. The combination, in a button-hole cutting and stitching machine, of a frame, a shaft mounted upon said frame actuated by a belt, a starting and stopping mechanism therefor, and a button-hole cutter actuated from said shaft, a second shaft mounted upon said frame operated independently of the first-named shaft by a separate or independent belt, an independent starting and stopping mechanism therefor, and stitching mechanism operated from said shaft, substantially as described.

10. The combination of the button-hole-cutter-actuating shaft $C^2$, the button-hole cutter operated therefrom, the button-hole-stitching mechanism, its operating-shaft, its starting mechanism, and an actuating device upon the shaft $C^2$ for actuating said starting mechanism, as and for the purposes described.

11. The combination of the shaft $C^2$, its starting and stopping mechanism, a cam $c^{23}$ upon said shaft, the main shaft $A'$ of the stitching mechanism, its starting and stopping devices, and a connection between the cam $c^{23}$ and the shipper of the starting and stopping mechanism on said shaft $A'$, comprising the bent lever $c^{24}$, lever $c^{26}$, and rod or shaft connecting said lever with the shipper and the button-hole cutting and stitching mechanism, substantially as described.

12. The combination of the intermediate slide-plate $a^3$, having the slide-blocks $x^4$, movable in opposition to the springs $x^5$, with the two sections $a\ a'$ of the clamp-plate pivoted, respectively, one to one slide-block and the other to the other, in combination with the clamps B B' and the sewing mechanism, substantially as described.

13. The combination of the members $a\ a'$ of the clamp-plate, pivoted at their front ends, respectively, to yielding blocks carried by the intermediate slide-plate $a^3$, said slide-plate, the rear positioning-springs $b^{17}$ $b^{18}$, and the stitching mechanism, substantially as described.

14. The combination of the clamp-plate, the intermediate traversing slide-plate upon which the clamp-plate is mounted, the slide bed-plate, the clamps B B', their holders, an automatic lock or latch $b^{13}$, carried by the intermediate plate $a^3$, and an automatic device to move said latch from engagement with the clamp-holder at the end of the operation of the machine, substantially as described.

15. The combination of the intermediate traversing plate $a^3$, the sections $a$ $a'$ of the clamp-plate, pivoted at their forward ends, respectively, to yielding blocks carried by said plate $a^3$, and the stop $c^{22}$, and yielding stop $c^{21}$, substantially as described.

16. The combination of the clamp-plate, the clamps B B', the clamp-depressing holders, the latch therefor, and the automatic latch-disengaging mechanism comprising the lever $g'$, one end of which engages the latch and the other of which carries a tripping-latch, and a tappet which trips the tripping-latch moving in one direction, but rides over it and causes the operation of the lever moving in the reverse direction, substantially as described.

17. The combination of the clamp-plate, the clamp-plate depressing and holding arms mounted upon the shaft $b^5$, the said shaft $b^5$, the arm or lever $b^{16}$, and a latching or locking lever $b^{13}$ to close under the arm or lever $b^{16}$ when actuated by the spring $b^{15}$, said spring $b^{15}$, and a lever G for moving the lever $b^{13}$ to disengage it from the lever or arm $b^{16}$, substantially as described.

18. In a button-hole stitching and barring machine, in combination with the stitching mechanism, a slide-plate supporting the work-clamping mechanism and having the movements in relation to the stitching devices specified, the work-clamping mechanism mounted upon said slide-plate and comprising two separate members movable toward and from each other and also together transversely in the same direction, and means, such as a lever, for bearing against one of the members of the clamping mechanism to move it toward the other member and both members transversely upon the said slide-plate to close the button-hole slot and move the material slightly sidewise in relation to the stitching mechanism, and a lever-actuating device to move the lever and plates at the end of the stitching of the last side of the button-hole, as and for the purposes described.

19. The combination, in a button-hole stitching and barring machine, of the stitching mechanism, the plate $a^3$, having movements, substantially as specified, imparted to it, the sections $a$ $a'$ of the clamping-plate, secured at their front ends to the traversing plate to be laterally movable thereon and to be separable in relation to each other, a section of the work-clamp carried by each clamp-plate, and an actuating device, such as a lever, to engage one of the sections of the clamp-plate to first move it and its member of the clamp toward the other section of the clamp-plate and its clamp and then both members of the clamp-plate and clamps a limited distance, whereby the material is puckered and moved bodily slightly sidewise, being turned in relation to the stitching mechanism and thus made ready for the sewing of the bar, as and for the purposes described.

20. The combination, with the stitching mechanism, of the clamp-plate in two sections $a$ $a'$, transversely movable upon the plate $a^3$, springs to move said sections toward each other, the separable clamps B B', a lever to engage one of said sections of the clamp-plate, a cam connected with said lever for determining the time of its operation, and a second lever connected with the first-named lever by intermediate mechanism, substantially as specified, and which is brought into operative relation therewith by said cam and into operative connection with a reciprocating part of the machine, preferably the lower needle-bar lever, and said lower needle-bar lever, as and for the purposes described.

21. As a means of closing the clamps of a button-hole-stitching machine together and moving the clamp-plate transversely in relation to the stitching mechanism, a lever to engage one member of the clamp-plate attached to a rock-shaft, said rock-shaft, an arm connected with said rock-shaft bearing a pivoted connecting-rod, a lever connected with said rod and operated by a cam for moving said rod into and out of relation with an actuating-lever $f^7$, and said actuating-lever, the lower needle-bar lever, and the springs $f^{14}$ $f^{20}$, substantially as described.

22. The combination, in a button-hole-stitching machine, of blocks supporting the needles and looping devices and mechanism, substantially as specified, for rotating said blocks, a latch to engage said mechanism at the end of its movement in one direction, and a latch-disengaging device actuated by a portion of or an attachment to the driven member of the clutch and at the time of the disengagement of the driven member from the driving member of the clutch, substantially as described.

23. The combination of the rotary blocks for carrying the needle-bars and looping devices, means for rotating the said blocks, substantially as specified, and a latch to engage the said rotating mechanism at the end of its movement in one direction, comprising the catch H, the latching-bar $h$, and the latch $h'$, substantially as described.

24. The combination, in a button-hole-stitching machine, of superimposed rotary blocks carrying the needle-bars and looping devices, mechanism for rotating the blocks at stated periods, as indicated, a latch carried by said last-named mechanism to engage a catch at the end of the movement of said rotating mechanism in one direction, a rod connected with said catch to actuate it, carried by and movable with the shipper-arm $c^{28}$, the said shipper-arm, and a projection or stop-pin $c^{33}$ upon the driven member of the clutch to actuate said rod, as and for the purposes described.

25. The combination of the rock-lever $e^{13}$, pivoted at $e^{14}$ to a bracket $e^{15}$, carried by the rotary block $d^5$ and having in an upwardly-extending arm the cam-groove $e^{17}$, a cam-pin $e^{16}$ upon the looper-slide $e$ to enter and travel in said cam-slot $e^{17}$ to oscillate the said lever, a looper-holding lever $e^{10}$, pivoted at $e^{12}$ to said first-named lever, a cam-lever $e^{18}$, having the cams $e^{21}$ and $e^{25}$, one of which operates directly upon the looper-lever, and the other of which is operated upon by the needle-bar for the purpose of varying the position of the first-named or looper-lever-operating cam, and the spring $e^{23}$, substantially as described.

26. The combination, in a button-hole-stitching machine, of the reciprocating eye-pointed needles D D', the clamp-plate and clamps, the loopers E E', and means, substantially as specified, for imparting to the loopers movements whereby each describes a forward movement in relation to the two needles upon a curved path and a return movement upon a path of a different curve, as and for the purposes described.

27. The combination, in a button-hole stitching and barring machine, of a bed-slide having a step-by-step movement forward toward the front of the machine and back, a traversing plate carried thereby, a clamp-plate supported by the traversing plate and having a transverse yielding movement upon said traversing plate, the separable work-clamps, the stitching mechanism comprising the needles D D' and the loopers E E', means for rotating the needles and loopers during the stitching of the eye of the button-hole, and an actuating device for moving one clamp toward the other and the clamp-plate laterally with relation to the stitching mechanism after the stitching of the last side of the button-hole, but before the machine comes to rest, whereby the material is released from strain, slightly puckered, brought into a new relation to the sewing mechanism, and a barring-stitch of the same length as the other stitches sewed, substantially as described.

28. The combination, in a button-hole stitching and barring machine, of the slide bed-plate having an intermittent movement forward and back in the bed, a traversing plate carried thereby, a clamp-plate supported by the traversing plate, the work-clamps, the work-clamp holders, a latch for locking the holders upon the work-clamps, the reciprocating needles D D', the loopers E E', mechanism for rotating the same in stitching about the eye of the button-hole, the latch for engaging and holding the said rotating mechanism at the end of its movement, and devices for disengaging the clamp-holder lock or latch and the latch for holding said rotating mechanism simultaneously with the operation of the stopping mechanism of the machine, as and for the purposes described.

29. In a button-hole stitching and barring machine, the combination of a common frame, an actuated shaft having starting and stopping mechanism, a clamp-plate cam, a button-hole-cutter cam, and a clamp-spreader cam mounted upon said shaft, a clamp-plate, button hole-cutter and clamp-spreader actuated by said cams, respectively, a cam carried by said shaft, the starting mechanism of the button-hole-stitching machine connected therewith, a clamp-plate depressor or holder connected with the starting mechanism of the first-named shaft, an automatic latch or lock for engaging said holder to lock the same after it has been actuated to depress the clamps, the bed-plate having a feed movement forward and back upon the bed of the machine, a traversing plate carried thereby, a separable clamp-plate carried upon said traversing plate and laterally movable thereon, stitching mechanism comprising the needles D D', the loopers E E', operated and rotated substantially as described, a movable device to act against one of the members of the clamp-plate after the stitching of the last side of the button-hole to close the plates and clamp and to also move them laterally to vary the position of the material with regard to the needles, mechanism for automatically disengaging the latch or lock from the clamp depressors and holders at the end of the stitching of the bar, an automatic stopping mechanism, and mechanism for returning the needles and loopers and their actuating rotating devices to their original position upon the stopping of the machine, substantially as described.

JAMES H. REED.
CHARLES A. DAHL.

In presence of—
F. F. RAYMOND, 2d,
J. T. BALL.